US012444820B2

(12) United States Patent
Bao et al.

(10) Patent No.: US 12,444,820 B2
(45) Date of Patent: Oct. 14, 2025

(54) ON-CHIP DUAL-MODE TRANSMISSION LINE WITH SPOOF SURFACE PLASMON BASED ON BALUN

(71) Applicant: Southeast University, Nanjing (CN)

(72) Inventors: Di Bao, Nanjing (CN); Tiejun Cui, Nanjing (CN); Kai Lu, Nanjing (CN); Chenchen Li, Nanjing (CN); Jiemin Wu, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 142 days.

(21) Appl. No.: 18/434,262

(22) Filed: Feb. 6, 2024

(65) Prior Publication Data

US 2024/0258672 A1 Aug. 1, 2024

Related U.S. Application Data

(63) Continuation of application No. PCT/CN2023/086378, filed on Apr. 5, 2023.

(30) Foreign Application Priority Data

Nov. 22, 2022 (CN) ........................ 202211465872.6

(51) Int. Cl.
*H01P 3/08* (2006.01)
*H01P 1/00* (2006.01)

(52) U.S. Cl.
CPC . *H01P 3/08* (2013.01); *H01P 1/00* (2013.01)

(58) Field of Classification Search
CPC ...... H01P 5/10; H01P 3/08; H01P 1/00; H01P 3/026
See application file for complete search history.

(56) References Cited

U.S. PATENT DOCUMENTS

2006/0167666 A1* 7/2006 Hsu ...................... G06F 30/367 703/2
2013/0169376 A1* 7/2013 Han .......................... H01P 5/10 333/26

(Continued)

FOREIGN PATENT DOCUMENTS

CN 108417941 A 8/2018
CN 110048220 A 7/2019

(Continued)

*Primary Examiner* — Quan Tra
(74) *Attorney, Agent, or Firm* — MUNCY, GEISSLER, OLDS & LOWE, P.C.

(57) ABSTRACT

An on-chip dual-mode transmission line with an spoof surface plasmon based on a balun includes a dual-mode transmission line located in the intermediate, the balun structures symmetrically located at both terminals of the dual-mode transmission line, and pad structures and excitation portions located outside the balun structures. The dual-mode transmission line comprises two metal strip lines that are the same in structure and parallel to each other, and the branches located between the two metal strip lines. The dual-mode transmission line can simultaneously support the transmissions of the odd-mode spoof surface plasmon signal and the even-mode spoof surface plasmon signal, and is not only suitable for III-V chips such as gallium arsenide and silicon nitride, but also suitable for technologies such as other chips and printed circuit boards.

15 Claims, 20 Drawing Sheets

(56) References Cited

U.S. PATENT DOCUMENTS

| | | | | |
|---|---|---|---|---|
| 2013/0301983 | A1 | 11/2013 | Mazumder et al. | |
| 2022/0059947 | A1* | 2/2022 | Chang .................. | H01Q 13/206 |

FOREIGN PATENT DOCUMENTS

| | | | |
|---|---|---|---|
| CN | 110854494 | A | 2/2020 |
| CN | 111180845 | A | 5/2020 |
| CN | 112886168 | A | 6/2021 |
| CN | 113488751 | A | 10/2021 |
| CN | 115207621 | A | 10/2022 |
| CN | 115548615 | A | 12/2022 |

* cited by examiner

ON-CHIP DUAL-MODE TRANSMISSION LINE WITH SPOOF SURFACE PLASMON BASED ON BALUN

TECHNICAL FIELD

The present disclosure belongs to the technical field of the dual-mode transmission line structure, and is a structural design that is the deformation of the traditional parallel coupled lines for processing the electromagnetic wave signals based on the balun structure, especially an on-chip dual-mode transmission line structure with an spoof surface plasmon based on a balun.

BACKGROUND

The balun is a three-port device and is a broadband radio frequency transmission line transformer that can convert a matched input into a differential output to implement a connection between the balanced transmission line circuit and the unbalanced transmission line circuit. The function of the balun is to enable the system to have different impedances or to be compatible with differential signals to adopt in modern communication systems such as the mobile phones and the data transmission networks.

Surface plasmons are the surface electromagnetic waves formed under certain excitation conditions and transmitted on the metal and dielectric interface. The surface plasmons can confine the energy of electromagnetic fields in the deep sub-wavelength range and are not limited by the diffraction limit, and have the excellent characteristics such as the strong field confinement, the short working wavelength and the high frequency cut-off. However, the surface plasmons in nature only exist in the optical band. In order to implement the surface plasmons in the lower frequency bands (terahertz, microwave, millimeter wave), spoof surface plasmons have been proposed, which has a huge application prospect in the aspects such as the integrated circuit, the communication technology and the sensors. The excellent performance is achieved by artificially simulating surface plasmons.

The transmission line is a device with the linear structure transporting the electromagnetic energy, and is an important portion of the telecommunications system. The transmission line is a wave-guiding structure used to transmit the electromagnetic waves carrying the information to deliver the electrical energy or the electric signals along the transmission line path in the form of the transverse electromagnetic waves. The characteristic of the transmission line is that the lateral dimensions is much smaller than the operating wavelength. The transmission lines are widely used in the fields such as the wireless transceivers, the computer network connections, and the high-speed communication lines. With the development of communication technology, the communication frequency is increasing. To enable the wave-guiding structure to transmit the microwave and the millimeter wave signals with higher frequencies and improve the communication capacity, the development of transmission lines is extremely important.

SUMMARY

Technical problems: The objectives of the present disclosure are to provide an on-chip dual-mode transmission line with an spoof surface plasmon based on a balun. The dual-mode transmission structure is designed with reference to the balun structure and the spoof surface plasmon transmission line structure on the basis of the traditional parallel coupling line in the present disclosure, which can transmit both odd-mode spoof surface plasmon signal and the even-mode spoof surface plasmon signal simultaneously.

Technical solutions: The on-chip dual-mode transmission line with the spoof surface plasmon based on the balun in the present disclosure is implemented through the following technical solutions.

The dual-mode transmission line structure comprises a dielectric adhesive, a dielectric material, a metal ground structure, metal strip lines, odd-mode signal pads, even-mode signal pads, four-port grounding terminals, and a dual-mode transmission line located in an intermediate of the dual-mode transmission line structure, a balun structure symmetrically located at both terminals of the dual-mode transmission line, and a pad feeding structure located outside each of the balun structure; the dual-mode transmission line includes two metal strip lines parallel to each other and branches between the two metal strip lines; each of the balun structure is formed by coupling two layers of metal structures, including upper metal meander lines, a lower metal meander line, a main feeding line, and a metal connection line; pads of each of the pad feeding structure includes the odd-mode signal pad, the even-mode signal pad and the four-port grounding terminals, each of the four-port grounding terminals is in a cuboid metal via structure, and is configured to connect a metal layer where the dual-mode transmission line is located with the metal ground structure covered under the dielectric material; connection lines of each of the pad feeding structure are signal connection lines led out from the odd-mode signal pad and the even-mode signal pad, including the metal connection line and the main feeding line; the lower metal meander line is in a C-shape, the odd-mode signal pad is connected to one terminal of the lower metal meander line through the metal connection line, and the even-mode signal pad is connected to a ring line through the main feeding line; the two metal strip lines are respectively connected at openings of each of the ring lines, and both ports of each of the two metal strip lines are respectively connected to an inward port of each of the upper metal meander lines, the inward port is a port facing towards an intermediate of the transmission line structure; two outward ports of the two upper metal meander lines are suspended in midair.

The balun structure further has a second structure, that is, the two inward ports facing towards the intermediate of the transmission line structure of the two upper metal meander lines are respectively connected to the two metal strip lines, and the two outward ports of the two upper metal meander lines are respectively connected to a same four-port grounding terminal located in an intermediate of the pad feeding structure through balun grounding lines; one terminal of the lower metal meander line is connected to the odd-mode signal pad through a tapered balun input terminal structure, and another terminal of the lower metal meander line is suspended in midair.

The balun structure further has a third structure, that is, the two inward ports facing towards the intermediate of the transmission line structure of the two upper metal meander lines are respectively connected to the two metal strip lines, or respectively connected to the two metal strip lines through quarter rings and trapezoidal connection blocks, two outward ports of the two upper metal meander lines are connected to two four-port grounding terminals through balun grounding lines, one terminal of the lower metal meander line is connected to the odd-mode signal pad through a tapered balun input terminal structure and another terminal of the lower metal meander line is suspended in midair.

The balun structure further has a fourth structure that is a triple-conductor edge-coupled balun structure, with output ports of two symmetrical triple-conductor edge-coupled baluns respectively connected to both terminals of each of the metal strip lines; a triple-conductor edge-coupled balun main body includes a triple-conductor structure formed by an excitation strip line, an internal coupling line and an external coupling line, and the excitation strip line, the internal coupling line and the external coupling line are all placed above the dielectric adhesive; the excitation strip line is a metal strip line bent in multiple times, one terminal of the excitation strip line is connected to the odd-mode signal pad through the odd-mode signal input port, and another terminal of the excitation strip line is suspended in midair; the internal coupling line is two metal strip lines symmetrically placed on an inward side of the excitation strip line; the external coupling line is two metal strip lines symmetrically placed on an outward side of the excitation strip line; one terminal of a cross-layer composite line is initiated from a tail terminal of the internal coupling line, firstly extended downward towards a bottom portion of the dielectric adhesive, and then extended parallel to the bottom portion of the dielectric adhesive after being bent at 90 degrees, subsequently passing under the excitation strip line, until being reached under a tail terminal of the external coupling line, then extended upwards to connect to a tail terminal of the external coupling line to converge signals on the internal coupling line and the external coupling line into one path signal, and the one path signal is outputted from a balun output port through a composite output line; the internal coupling line is divided into two meander lines symmetrical about a central axis of the balun structure, and intermediate portions of the two segments of the internal coupling line are jointly connected to one terminal of an internal grounding line, and are connected to the four-port grounding pad by an internal coupling line grounding port at another terminal of the internal grounding line; a metal protective ring wall is two segments of C-shaped metal walls symmetrically distributed outside the external coupling line, a bottom of the C-shaped metal wall is in contact with the metal ground structure; one terminal of the external coupling line is connected to the metal protective ring wall, a lower grounding line and an upper grounding line are respectively led out from the two segments of the metal protective ring wall and are respectively connected to the adjacent four-port grounding pad through a lower grounding port and an upper grounding port.

The balun structure further has a fifth structure, the fifth structure includes an odd-mode probe pad, an even-mode probe pad, ground probe pads, lower large plates, lower small plates; the odd-mode probe pad, the even-mode probe pad and the ground probe pads are located above the dielectric adhesive, the lower large plates and the lower small plates are located above the dielectric material; small-scale metal vias are arranged between the odd-mode probe pad and the lower small plate, between the even-mode probe pad and the lower small plate, and between the ground probe pads and the lower large plates, a back metallic via is arranged below the lower large plate, and the lowest portion of the back metallic via is in contact with the metal ground structure; in the fifth balun structure, a right-angle strip-shaped input line is located above the dielectric material, and is a metal strip line with a bent of 90°, one terminal of the right-angle strip-shaped input line is connected to the lower small plate below the odd-mode probe pad, and another terminal of the right-angle strip-shaped input line is connected to a port of a lower metal frame; the lower metal frame is formed by removing one longer side of a square frame, and an upper metal frame is located above the dielectric adhesive, and is a square frame by removing one longer side and a portion at an intermediate of another longer side of the upper metal frame, and remaining portions of the upper metal frame is directly opposite to the lower metal frame; and balun grounding transition lines are connected to ground probe pads on both side of the balun structure.

The branch in the dual-mode transmission line is a wave-shaped spoof surface plasmon unit, the wave-shaped spoof surface plasmon unit includes a plurality of wave-shaped structures placed in a region between the two metal strip lines parallel to each other, and periodically arranged along a length direction of the metal strip line, the wave-shaped spoof surface plasmon unit is two wave-shaped spoof surface plasmon unit structures in mirror symmetry, each of the wave-shaped spoof surface plasmon structure includes a quarter-arc metal line, and upper semi-circular metal rings and lower semi-circular metal rings interconnected in dimension from large to small connected in a sequence, one terminal of the quarter-arc metal line is connected to the metal strip line, and another terminal of the quarter-arc metal line is connected to the semi-circular metal ring.

A number of the semi-circular metal rings in the wave-shaped spoof surface plasmon unit is six, a dispersion cut-off frequency of the transmission line is reduced and a field confinement ability of a metal surface of the wave-shaped spoof surface plasmon unit is enhanced by increasing a quantity of the semi-circular metal rings.

The branch in the dual-mode transmission line is a broken-line-shaped spoof surface plasmon unit, the broken-line-shaped spoof surface plasmon unit includes a plurality of broken-line-shaped structures placed in a region between the two metal strip lines parallel to each other and periodically arranged along a length direction of the metal strip, the broken-line-shaped spoof surface plasmon unit is two broken-line-shaped spoof surface unit structures in mirror symmetry, each of the broken-line-shaped spoof surface plasmon unit includes square-wave structures connected sequentially, one terminal of the square-wave structure is connected to the metal strip line, another terminal of the square-wave structure is suspended in midair.

A number of the sequentially connected square-wave structure in the broken-line-shaped spoof surface plasmon unit is five, a cut-off frequency of the transmission line is reduced and a field confinement ability is enhanced by increasing a width of the metal strip line, increasing a length and a width of the square wave of the broken-line-shaped spoof surface plasmon unit, increasing a quantity of the square waves or increasing a period length of each of the broken-line-shaped spoof surface plasmon units.

The branch in the dual-mode transmission lines is a spring-shaped spoof surface plasmon unit, the spring-shaped spoof surface plasmon unit includes a plurality of spring-shaped structures placed in a region between the two parallel metal strip lines parallel to each other, and periodically arranged along a length direction of the metal strip line, the spring-shaped spoof surface plasmon unit is two spring-shaped spoof surface plasmon unit structures in upper and lower mirror-symmetry, each of the spring-shaped spoof surface plasmon unit includes a plurality of same shaped semi-circular rings in a periodic manner, and the adjacent semi-circular rings are connected to each other at openings through an interconnecting line, one terminal of the spring-shaped spoof surface plasmon unit is connected to a metal strip line, another terminal of the spring-shaped spoof surface plasmon unit is suspended in midair.

A number of the semi-circular rings in the spring-shaped spoof surface plasmon unit is six, a transmission cut-off frequency of the spring-shaped spoof surface plasmon unit is decreased and a field confinement ability of a metal surface of the spring-shaped spoof surface plasmon unit is enhanced by increasing an outer diameter or an inner diameter of the semi-circular ring, increasing a quantity of semi-circular rings, or increasing a period length of each of the spring-shaped spoof surface plasmon units.

The branch in the dual-mode transmission line is a butterfly-shaped spoof surface plasmon unit, the butterfly-shaped spoof surface plasmon unit includes a plurality of butterfly-shaped structures placed in a region between the two metal strip lines parallel to each other and periodically arranged along a length direction of the metal strip line, the butterfly-shaped spoof surface plasmon unit is a complete butterfly-shaped structure formed by two mirror-symmetrical half-butterflies, one terminal of the butterfly-shaped spoof surface plasmon unit is connected to the metal strip line, and another terminal of the butterfly-shaped spoof surface plasmon unit is suspended in midair.

The excitation strip line and the internal coupling line are edge-coupled, and the excitation strip line and the external coupling line are edge-coupled in the triple-conductor edge-coupled balun, a distance between edges of the internal coupling line and the excitation strip line is 5 um, and a distance between edges of the external coupling line and the excitation strip line is 5 um.

The main feeding line led out from the even-mode signal pad is connected at a center portion of a longer side of the ring line, two suspended terminals of the ring line are respectively connected to two sides of the two metal strip lines, the ring line is symmetrically distributed about the metal strip lines to implement an even-mode feeding with equal amplitude and same phase, and a length of the ring line is adjustable.

One antenna lead led out from the even-mode signal pad is connected to one terminal of the cross-layer coupling antenna between the two metal strip lines with a same structure and parallel to each other through two 90° bendings in a form of a strip-shaped line after passing through a trapezoidal transition section, and an even-mode signal is transmitted by the antenna lead and the cross-layer coupling antenna above the dielectric material.

Beneficial Effect

1. The on-chip transmission line with the spoof surface plasmon based on the balun designed by the present disclosure can simultaneously support the transmissions of the odd-mode spoof surface plasmon signal and the even-mode spoof surface plasmon signal.

2. The feeding structure designed by the present disclosure can transmit the differential mode signals with the equal amplitude and the opposite phase excellently, and provide a good signal input for the dual-mode transmission line.

3. The on-chip dual-mode transmission line with the spoof surface plasmon based on the balun designed by the present disclosure has a tiny electrical dimension of about 0.127 (λ)*0.013 (λ)*0.017 (λ).

4. The balun structure designed by the present disclosure can balance the voltage and the current, suppress the common-mode current well, and convert the impedance, which is beneficial to the signal transmission.

5. The scattering parameters such as the bandwidth, the center frequency, the insertion loss, the return loss, the amplitude for the dual-mode transmission line can be adjusted by changing the structural dimension parameters for the balun structure in the present disclosure.

6. The dispersion properties of the spoof surface plasmons can be adjusted by changing the structural dimension parameters for the dual-mode transmission line in the present disclosure.

7. The on-chip dual-mode transmission line with the spoof surface plasmon based on the balun designed by the present disclosure can concentrate most of the electric field energy approximate to the metal surface of the transmission line, which reflects that the spoof surface plamon has the strong field confinement ability and the extremely low discontinuity loss.

8. The structure designed by the present disclosure is simple, and can support the design work of the terahertz band, the microwave band and the millimeter wave band through the proportional scaling and amplification of the balun structure and the transmission line structure, and has good development prospects in many fields.

9. The odd-mode feeding structure, the even-mode feeding structure, and the dual-mode transmission line of the present disclosure have various designs, and can be selected and combined, and have a wide practicability.

BRIEF DESCRIPTION OF THE DRAWINGS

FIG. 17(*a*) illustrates the dispersion property of the spring-shaped spoof surface plasmon unit; FIG. 17(*b*) illustrates the scattering parameters for the even mode of the dual-mode transmission line; FIG. 17(*c*) illustrates the scattering parameter for the odd mode of the dual-mode transmission line; FIG. 17(*d*) illustrates the impedances for the even and the odd modes of the dual-mode transmission line; and FIG. 17(*e*) illustrates the wave impedances for the even and the odd modes of the dual-mode transmission line.

Figure 1:
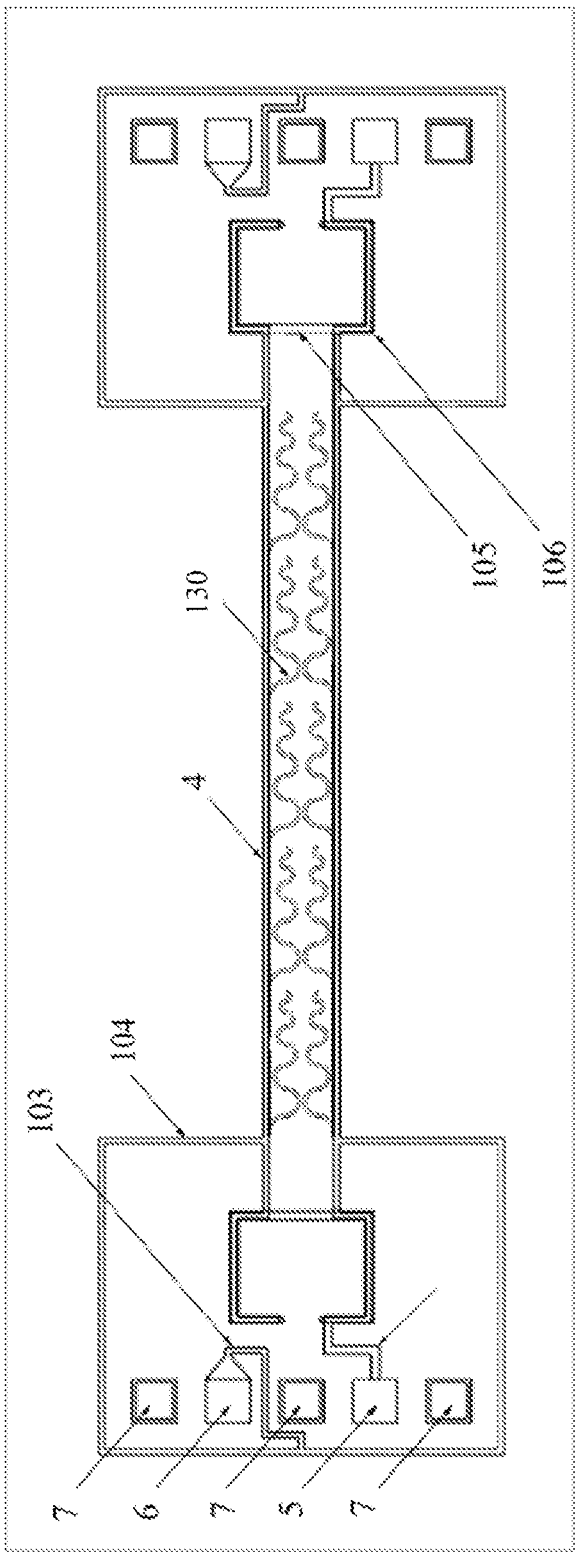
FIG. 1 illustrates a top view of a first balun structure of an on-chip dual-mode transmission line with an spoof surface plasmon based on a balun of the present disclosure; the branch in the dual-mode transmission line is a wave-shaped spoof surface plasmon unit.

In the drawings: 1. Dielectric glue; 2. Dielectric material; 3. Metal ground structure; 4. Metal strip line; 5. Odd-mode signal pad; 6. Even-mode signal pad; 7. Four-port grounding terminal; 8. Triple-conductor edge-coupled balun; 9. Odd-mode probe pad; 10. Even-mode probe pad; 11. Ground probe pad; 12. Lower large plate; 13; Lower small plate; 14. Small-scale metal via; 15. Back metallic via; 101. Tapered balun input terminal structure; 102. Balun grounding line; 103. Main feeding wire; 104. Ring line; 105. Lower metal meander line; 106. Upper metal meander line; 107. Quarter ring; 108. Trapezoidal connection block; 109. Metal connection line; 139. Direct grounding via; 110. Spring-shaped spoof surface plasmon unit; 120. Broken-line-shaped spoof surface plasmon unit; 130. Wave-shaped spoof surface plasmon unit; 140. Butterfly-shaped spoof surface plasmon unit; 150. Bird-shaped spoof surface Plasmon unit; 161. Antenna lead; 162. Cross-layer coupling antenna;

201. Right-angle strip-shaped input line; 202. Balun grounding transition line; 203. Lower metal frame; 204. Upper metal frame;

80. Odd-mode signal input port; 81. Excitation strip-shaped line; 82. Internal coupling line; 83. External coupling line; 84. Cross-layer composite line; 85. Composite output line; 86. Internal line grounding line; 87. Lower grounding line; 88. Upper grounding line; 89. Metal Protective ring wall; 90. Balun output port; 91 Internal coupling line grounding port; 92. Lower grounding port; and 93. Upper grounding port.

DETAILED DESCRIPTION OF THE EMBODIMENTS

The present disclosure will be further described in detail below through the specific embodiments, the following embodiments are only descriptive, not restrictive, and the protection scope of the present disclosure cannot be limited with these embodiments.

An on-chip dual-mode transmission line with an spoof surface plasmon based on a balun is as illustrated in FIG. 1. The dual-mode transmission line structure includes a dielectric adhesive 1, a dielectric material 2, a metal ground structure 3, metal strip lines 4, odd-mode signal pads 5, even-mode signal pads 6, four-port ground terminals 7, and a dual-mode transmission line located in the intermediate of the dual-mode transmission line structure, a balun structure symmetrically located at both terminals of the dual-mode transmission line, and a pad feeding structure located outside each of the balun structure. The dual-mode transmission line includes two metal strip lines 4 parallel to each other and branches located between the two metal strip lines 4. The balun structure is formed by coupling two layers of metal structures, including upper metal meander lines 106, a lower metal meander line 105, a main feeding line 103, and a metal connection line 109. The pads of the pad feeding structure include an odd-mode signal pad 5, an even-mode signal pad 6 and four-port grounding terminals 7. The four-port ground terminals 7 are in a cuboid metal via structure which are configured to connect a metal layer where the dual-mode transmission line is located with the metal ground structure 3 covered under the dielectric material 2. The connection lines of the pad feeding structure are the signal connection lines led out from the odd-mode signal pad 5 and the even-mode signal pad 6, including the metal connection line 109 and the main feeding line 103. The lower metal meander line 105 is in a C-shape. The odd-mode signal pad 5 is connected to one terminal of the lower-layer metal meander line 105 through the metal connection line 109, and the even-mode signal pad 6 is connected to a ring line 104 through the main feeding line 103. Two metal strip lines 4 are respectively connected at the openings of the ring line 104, and both ports of each of the two metal strip lines 4 are respectively connected to the inward port of each of the upper metal meander lines 106, the inward port is the port facing towards the intermediate of the transmission line structure, and two outward ports of the two upper meander lines 106 are suspended in midair.

Figure 2:
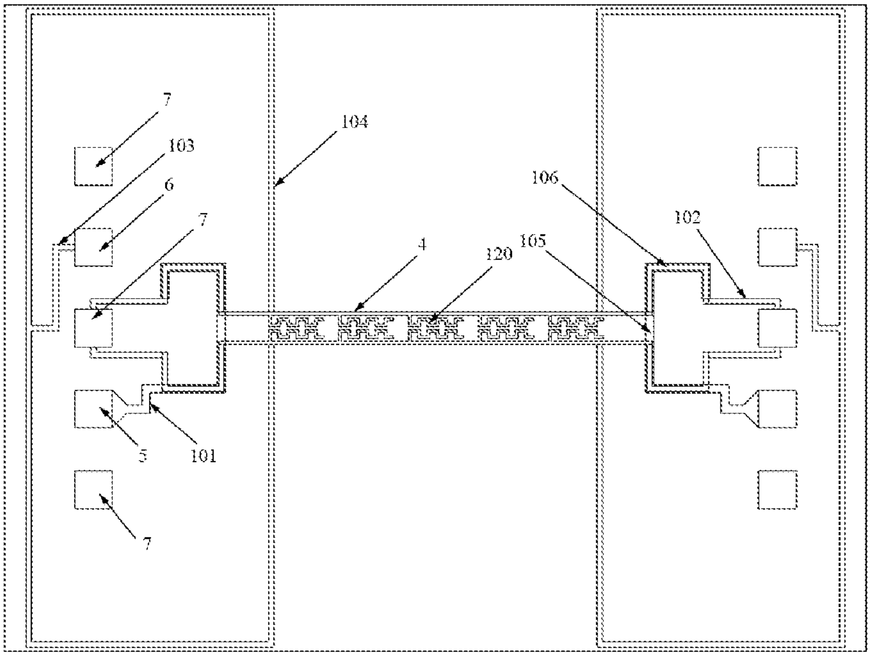
FIG. 2 illustrates a top view of a second balun structure of the on-chip dual-mode transmission line with the spoof surface plasmon based on the balun of the present disclosure; the branch in the dual-mode transmission line is broken-line-shaped spoof surface plasmon unit.

A second kind of the dual-mode transmission line on the spoof surface plasmon chip based on the balun is as illustrated in FIG. 2. The adopted second balun structure, that is, the two inward ports approximate to the midline of the transmission line structure of the two upper metal meander lines 106 are respectively connected to the two metal strip lines 4, the two outward ports of the two upper metal meander lines 106 are respectively connected to a same four-port grounding terminal 7 located in the intermediate of the pad feeding structure through the balun grounding lines 102, one terminal of the lower metal meander line 105 is connected to the odd-mode signal pad through a tapered balun input terminal structure 101, and the other terminal of the lower metal meander line 105 is suspended in midair.

Figure 3:
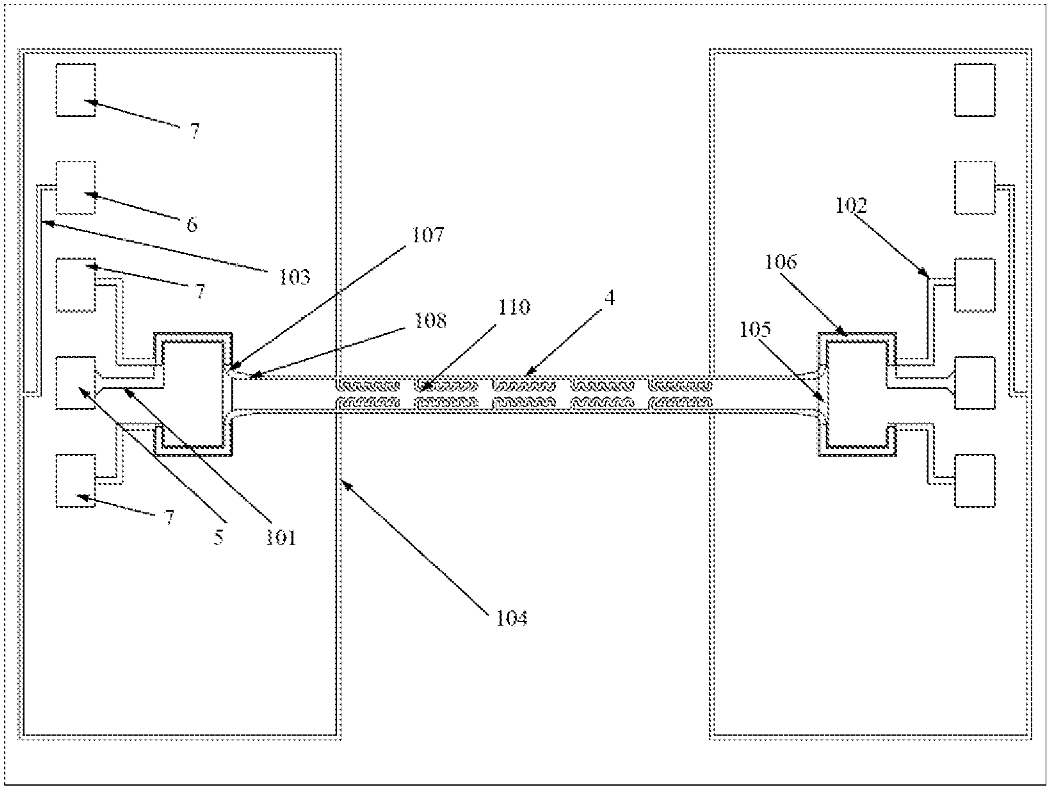
FIG. 3 illustrates a top view of a third balun structure of the on-chip dual-mode transmission line with the spoof surface plasmon based on the balun of the present disclosure; the branch in the dual-mode transmission line is spring-shaped spoof surface plasmon unit.

A third kind of the dual-mode transmission line on the spoof surface plasmon chip based on the balun is as illustrated in FIG. 3. The adopted third balun structure, that is, the two inward ports approximate to the midline of the transmission line structure of the two upper metal meander lines 106 are respectively connected to the two metal strip lines 4 through the quarter rings 107 and the trapezoidal connection blocks (108), the two outward ports of the two upper metal meander lines 106 are respectively connected to two four-port grounding terminals 7 through the balun grounding lines 102, one terminal of the lower metal meander line 105 is connected to the odd-mode signal pad 5 through a tapered balun input terminal structure 101, and the other terminal of the lower metal meander line 105 is suspended in midair. The branch in the dual-mode transmission line is the spring-shaped spoof surface plasmon unit.

Figure 4:
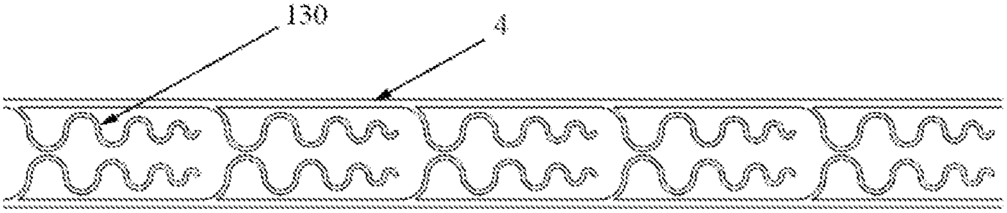
FIG. 4 illustrates a top view of the branch in the dual-mode transmission line of the present disclosure, where the branch is the wave-shaped spoof surface plasmon unit.

As illustrated in FIG. 4, the wave-shaped spoof surface plasmon unit 130 is adopted as a branch in the dual-mode transmission line. The wave-shaped spoof surface plasmon unit includes a plurality of structures placed in a region between the two metal strip lines 4 parallel to each other and periodically arranged along a length direction of the metal strip line 4. The wave-shape spoof surface plasmon unit 130 is two wave-shaped spoof surface plasmon unit structures in mirror symmetry, and each of the wave-shaped spoof surface plasmon unit structures includes a quarter-arc metal line, and upper semi-circular metal rings and lower semi-circular metal rings interconnected in a dimension from large to small connected in sequence. One terminal of the quarter-arc metal line is connected to the metal strip line 4, and the other terminal of the quarter-arc metal line is connected to the semi-circular metal ring.

Figure 5:
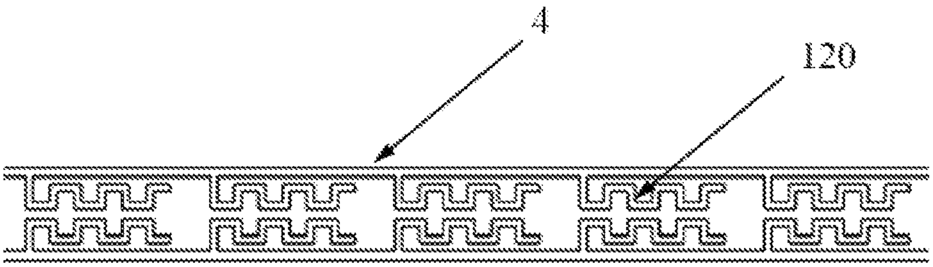
FIG. 5 illustrates a top view of the branch in the dual-mode transmission of the present disclosure, where the branch is the broken-line-shaped spoof surface plasmon unit.

As illustrates in FIG. 5, the broken-line-shaped spoof surface plasmon unit 120 is adopted as a branch in the dual-mode transmission line. The broken-line-shaped spoof surface plasmon unit includes a plurality of structures placed in a region between two metal strip lines 4 parallel to each other and arranged periodically along a length direction of the metal strip line 4. The broken-line-shaped spoof surface plasmon unit 120 is two broken-line-shaped spoof surface plasmon unit structures in mirror symmetry, and each of the broken-line-shaped spoof surface plasmon units 120 includes the square-wave shaped structures that are connected in sequence, and one terminal of the square-wave shaped structure is connected to the metal strip line 4, and the other terminal of the square-wave shaped structure is suspended in midair.

Figure 6:
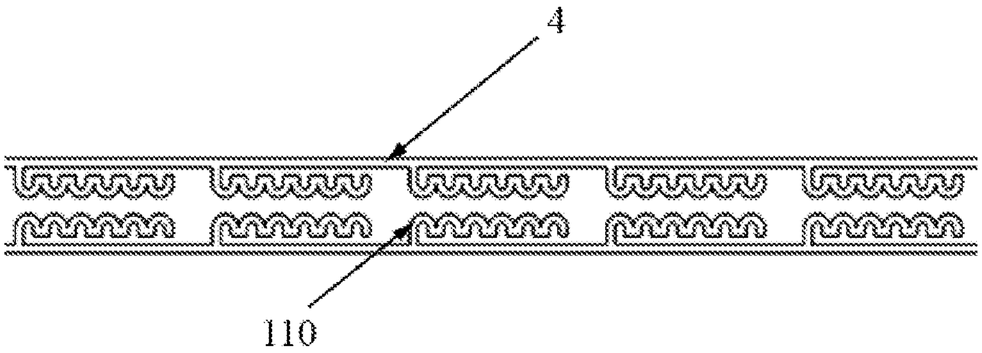
FIG. 6 illustrates a top view of the branch in the dual-mode transmission line of the present disclosure, where the branch is the spring-shaped spoof surface plasmon unit.

As illustrated in FIG. 6, the spring-shaped spoof surface plasmon unit 110 is adopted as a branch in the dual-mode transmission line. The spring-shaped spoof surface plasmon unit includes a plurality of structures placed in a region between two metal strip lines 4 parallel to each other and arranged periodically along a length direction of the metal strip line 4. The spring-shaped spoof surface plasmon unit 110 is two spring-shaped spoof surface plasmon unit structures in mirror symmetry, and each of the spring-shaped spoof surface plasmon units 110 includes a plurality of same shaped semi-circular rings arranged in a periodic manner, and the adjacent semi-circular rings are connected to each other at the openings through the interconnection line, one terminal of the spring-shaped spoof surface plasmon unit is connected to the metal strip line 4, and the other terminal is suspended in midair.

Figure 7:
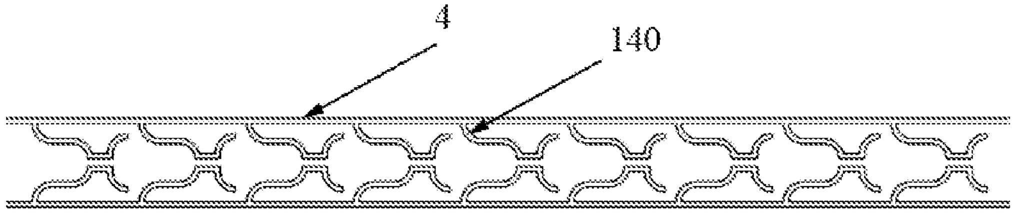
FIG. 7 illustrates a top view of the branch in the dual-mode transmission line of the present disclosure, where the branch is a butterfly-shaped spoof surface plasmon unit.

As illustrated in FIG. 7, the butterfly-shaped spoof surface plasmon unit 140 is adopted as a branch in the dual-mode transmission line. The butterfly-shaped spoof surface plasmon unit includes a plurality of structures placed in a region between two metal strip lines 4 parallel to each other and arranged periodically along a length direction of the metal strip line 4. The butterfly-shaped spoof surface plasmon unit 140 is a complete butterfly structure formed by two half-butterflies that are in mirror symmetry, one terminal of the butterfly-shaped spoof surface plasmon unit 140 is connected to the metal strip line 4, and the other terminal is suspended in midair.

Figure 8:
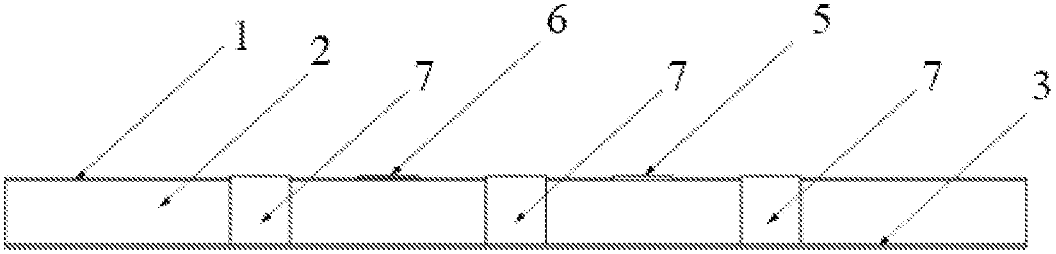
FIG. 8 illustrates a schematic diagram of a cross-sectional structure of the present disclosure.

A schematic diagram of the cross-sectional structure of the present disclosure is as illustrated in FIG. 8, which illustrates the positional relationship between the pads and the dielectric material. The dielectric adhesive 1, the dielectric material 2, the metal ground structure 3, the odd-mode signal pad 5, the even-mode signal pad 6, and the four-port grounding terminals 7 are respectively marked in the figure. The lowest portion of the odd-mode signal pad 5 is in contact with the top portion of the dielectric material 2, and the highest portion is 2 um higher than the top portion of the dielectric adhesive 1. The bottom portion of the even-mode signal pad 6 is in contact with the top portion of the dielectric adhesive 1 with a thickness of 2 um. The highest portion of the four-port grounding terminal 7 is 2 um higher than the top portion of the dielectric adhesive 1, and the lowest portion of the four-port grounding terminal is in contact with the metal ground structure 3.

Figure 9:
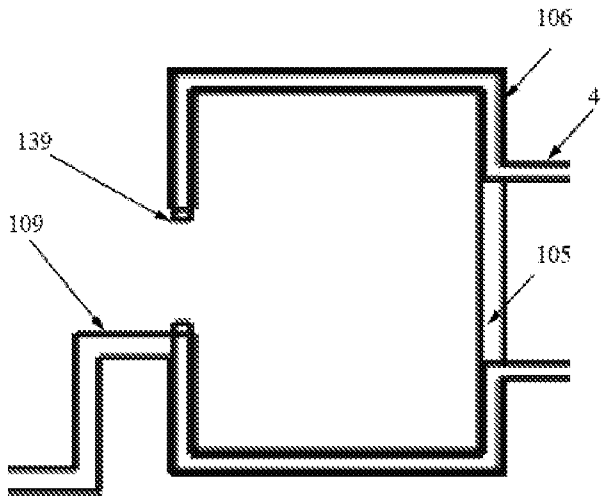
FIG. 9 illustrates a top view of the first balun structure of the present disclosure.

As illustrates in FIG. 9, the first balun structure of the present disclosure is formed by coupling two layers, which includes the upper metal meander lines 106, the lower metal meander line 105, and the metal connection line 109. The lower metal meander line 105 is in a C-shape, and the metal connection line 109 is connected to one terminal of the lower metal meander line 105. The upper metal meander lines 106 are in a C-shape symmetrical about the central axis of the first balun structure, facing the lower metal meander line 105 to form a coupling. One terminal of each of the upper metal meander lines 106 is connected to the metal strip lines 4, the other terminal of each of the upper metal meander lines 106 is connected to the direct grounding via 139, and the direct grounding via 139 is in communication with the metal ground structure 3.

Figure 10:
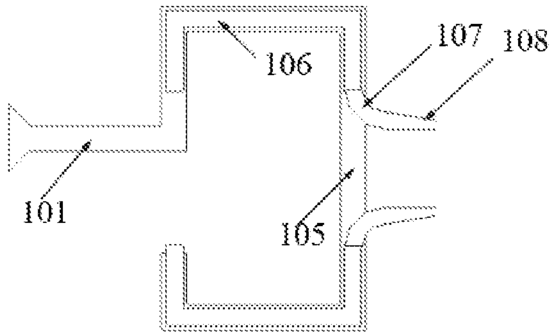
FIG. 10 illustrates a top view of the second balun structure of the present disclosure.

The second balun structure of the present disclosure is as illustrated in FIG. 10. Two inward ports approximated to the midline of the transmission line structure of the two upper metal meander lines 106 are connected to two metal strip lines 4. Two outward ports of the two upper metal meander lines 106 are respectively connected to the same four-port ground terminal 7 located the intermediate of the pad feeding structure through the balun ground lines 102. One terminal of the lower metal meander line 105 is connected to the odd-mode signal pad 5 through the tapered balun input terminal structure 101, and the other terminal of the lower metal meander line 105 is suspended in midair.

Figure 11:
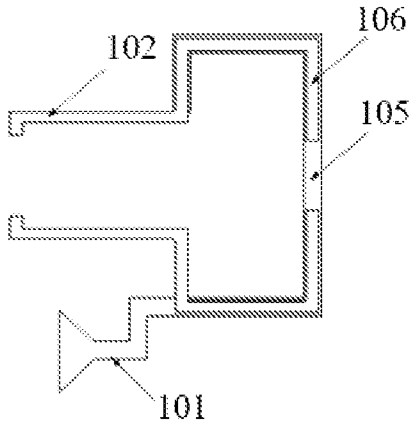
FIG. 11 illustrates a top view of the third balun structure of the present disclosure.

An enlarged view of a portion of the third balun structure of the present disclosure is as illustrated in FIG. 11. Two inward ports approximated to the midline of the transmission line structure of the two upper metal meander lines 106 are connected to the two metal strip lines 4 through the quarter rings 107 and the trapezoidal connection blocks 108. Two outward ports of the two upper metal meander lines 106 are respectively connected to two four-port grounding terminals 7 through the balun grounding lines 102. One terminal of the lower metal meander line 105 is connected to the odd-mode signal pad 5 through the tapered balun input terminal structure 101, and the other terminal of the lower metal meander line 105 is suspended in midair.

Figure 12A:
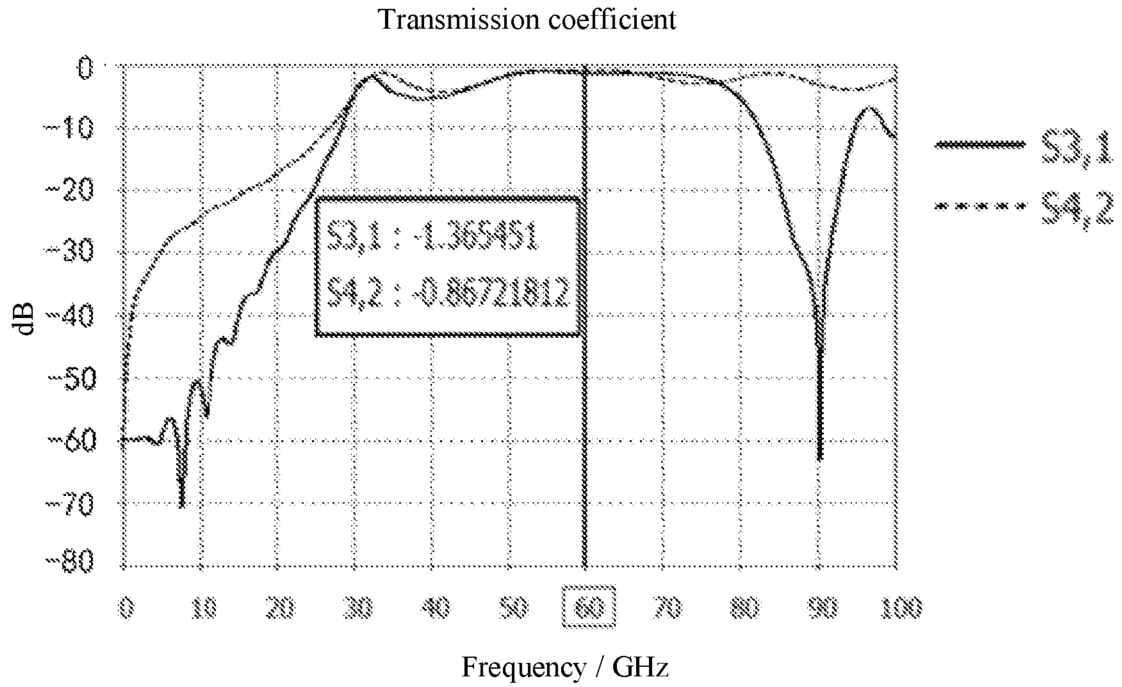
FIGS. 12(*a*) to 12(*c*) illustrate the simulation results for the scattering parameters for the first balun structure of the on-chip dual-mode transmission line with the spoof surface plasmon based on the balun in the present disclosure, FIG. 12(*a*) lists the transmission coefficient for the odd mode and the transmission coefficient for the even mode, FIG. 12(*b*) lists the reflection coefficient for the odd mode and the reflection coefficient for the even mode, and FIG. 12(*c*) lists the crosstalk between the ports.
Figure 12B:
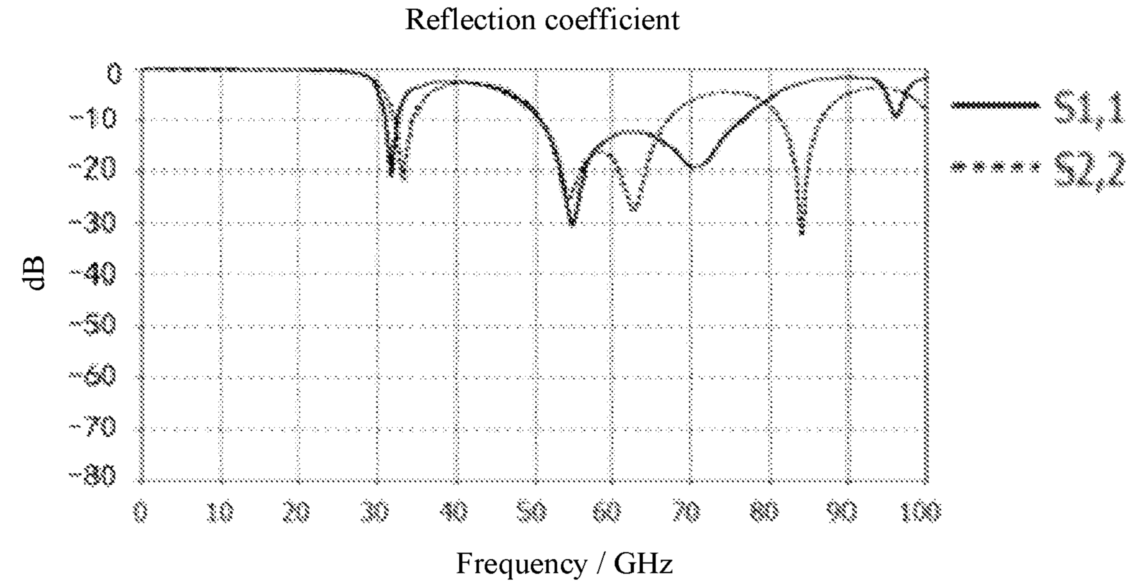
Figure 12C:
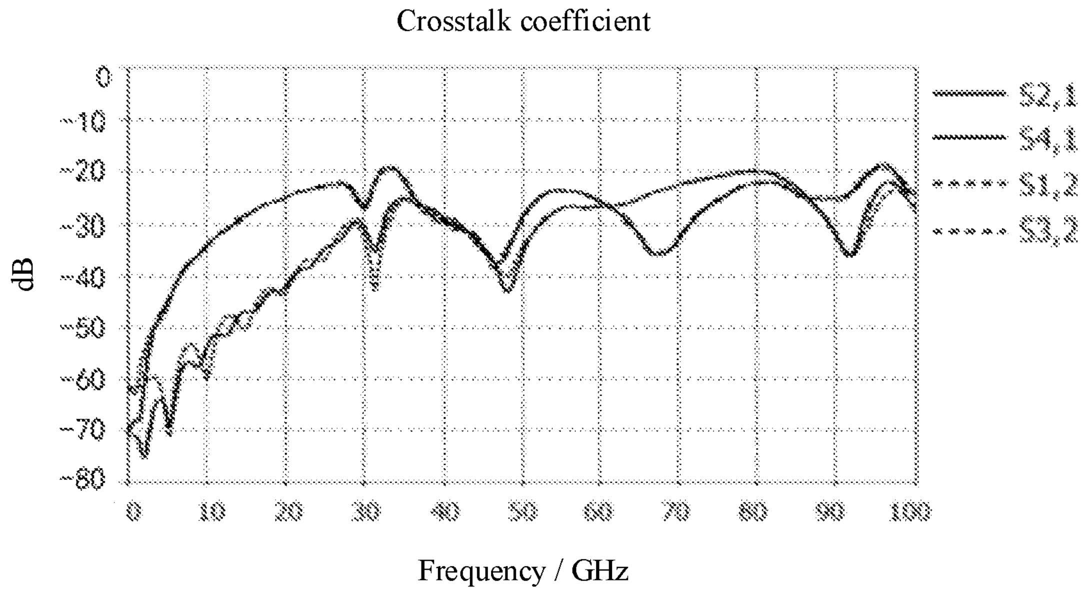

FIG. 12(*a*) to FIG. 12(*c*) illustrate the simulation results for the scattering parameters for the first balun structure of the on-chip dual-mode transmission line with the spoof surface plasmon chip based on the balun in the present disclosure. FIG. 12(*a*) illustrates the simulation parameter diagram of the transmission coefficient, where S3,1 denotes the transmission coefficient for the odd mode, S4,2 denotes the transmission coefficient for the even mode. FIG. 12(*b*) illustrates the simulation schematic diagram of the reflection coefficient, where S1,1 denotes the reflection coefficient for the odd-mode port, and S2,2 denotes the reflection coefficient for the even-mode port. FIG. 12(*c*) illustrates a diagram of the crosstalk coefficients for the ports. In FIG. 12(*a*), the transmission coefficient S3,1 for the odd mode is greater than −1.46 dB, and the transmission coefficient S4,2 for the even mode is greater than −1.42 dB within the range of 51 GHz to 67 GHZ, and the transmission coefficient S3,1 for the odd mode is −1.36 dB, and the transmission coefficient S4,2 for the even mode is −0.86 dB at 60 GHz. In FIG. 12(*b*), the reflection coefficient S1,1 for the port 1 and the reflection coefficient S2,2 for the port 2 are both less than −10 dB. In FIG. 12(*c*), the crosstalk coefficients for the ports are all less than −20 dB. It can be seen from FIGS. 12(*a*) to 12(*c*) that, the on-chip dual-mode transmission line with the spoof surface plasmon based on the balun has an excellent performance and can realize the ultra-wideband characteristics in the range of 51 GHz to 67 GHz.

Figure 13:
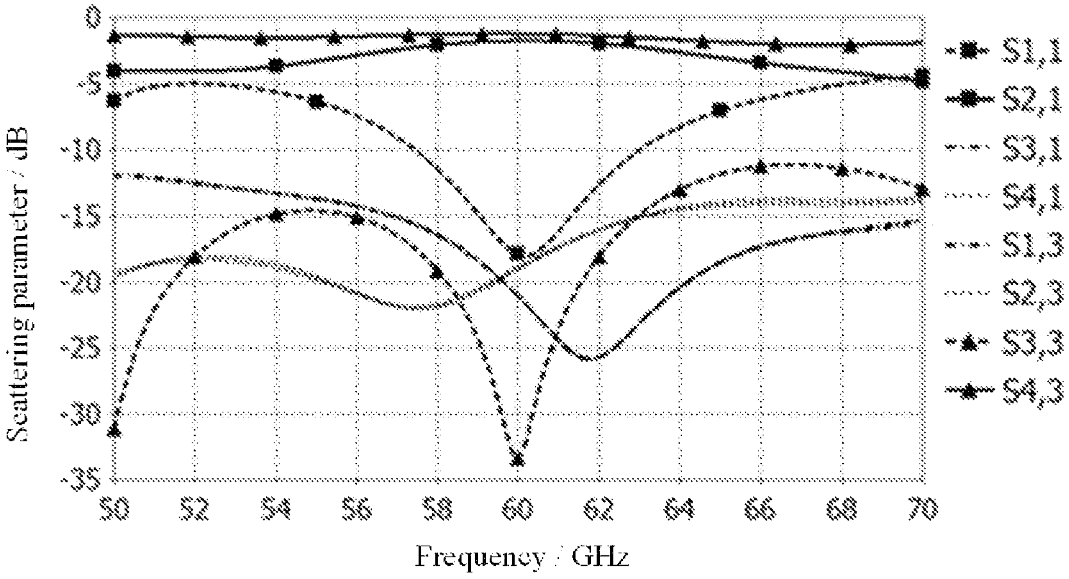
FIG. 13 illustrates the simulation result for the scattering parameters for the second balun structure of the on-chip dual-mode transmission line with the spoof surface plasmon based on the balun in the present disclosure.

FIG. 13 illustrates the simulation result for the scattering parameters for the second balun structure of the on-chip dual-mode transmission line with the spoof surface plasmon based on the balun in the present disclosure. The effective passband is defined between 57.5 GHz and 63 GHz. In the passband, the transmission coefficient S2,1 for the odd-mode signal is more than −2.4 dB, and the peak value of −1.7 dB for the odd-mode signal is at 60 GHz, and the return loss coefficient S1,1 for the odd-mode signal is less than −10 dB. In the passband, the transmission coefficient S4,3 for the even-mode signal is more than −1.5 dB, and the return loss coefficient S3,3 for the even-mode signal is less than −15 dB. Other scattering parameters are tested by the four-ports, and S3,1, S4,1, S1,3, S2,3 respectively represent the crosstalk among the ports, and the crosstalk in the passband is less than −15 dB. The above results indicate that the even-mode and the odd-mode signals can be transmitted with good performance through the same-frequency dual-mode transmission line of the present disclosure. Little crosstalk among the ports indicates that neither the odd-mode signals nor the even-mode signals are easily absorbed by unrelated ports during the transmission, that is, the odd-mode signal passes through the transmission path of the port 1, the pad, the balun, the spoof surface plasmon transmission line, the balun, the pad, and the port 2, and the even-mode signal passes through the transmission path of the port 3, the pad, the even-mode feeding line, the ring feeding line, the spoof surface plasmon transmission line, the ring feeding line, the even-mode feeding line, the pad, and the port 4. The two paths are merely spatially overlapped on the spoof surface plasmon transmission line, and the odd-mode and even-mode signals are orthogonal to each other and independent, so that the odd-mode and the even-mode signals can pass through the spoof surface plasmon transmission line together, and are separated from each other at front and rear of the spoof surface plasmon transmission line to enter the corresponding feeding port respectively.

Figure 14:
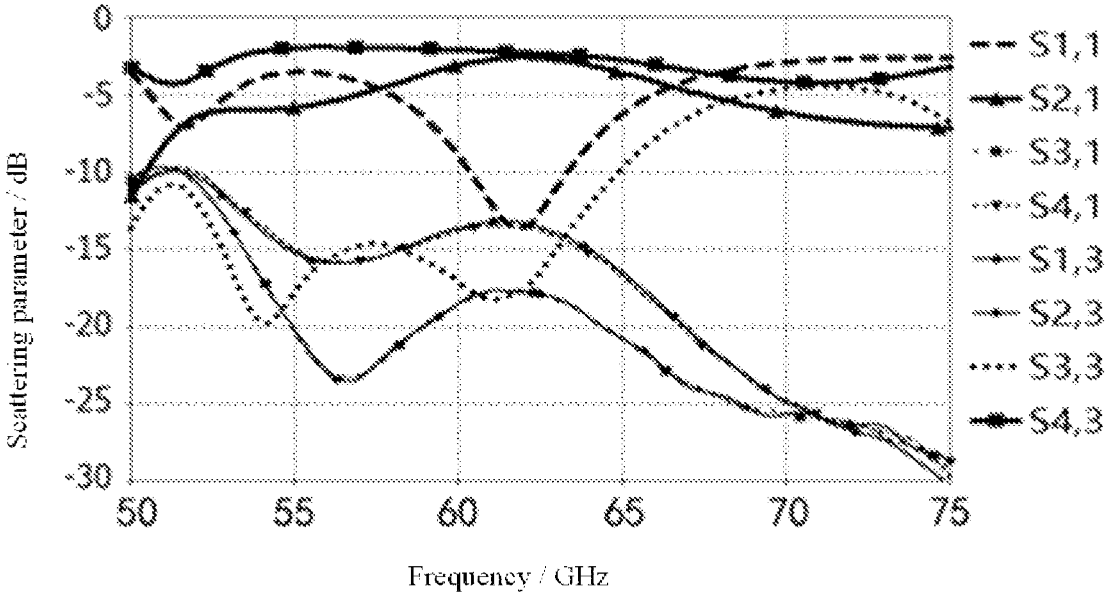
FIG. 14 illustrates the simulation result for the scattering parameters for the third balun structure of the on-chip dual-mode transmission line with the spoof surface plasmon based on the balun in the present disclosure.

FIG. 14 illustrates the simulation results for the scattering parameters for the third balun structure of the on-chip dual-mode transmission line with the spoof surface plasmon based on the balun in the present disclosure. The effective passband is defined between 60.3 GHz and 63.3 GHZ. In the passband, the transmission coefficient S2,1 for the odd-mode signal is more than −3.11 dB, and the peak value of −2.56 dB for the odd-mode signal is at 62 GHZ, and the return loss coefficient S1,1 for the odd-mode signal is less than −10 dB. In the passband, the transmission coefficient S4,3 for the even-mode signal is more than −2.4 dB, and the return loss coefficient S3,3 for the even-mode signal is less than −14 dB. Other scattering parameters are tested by the four-ports, and S3,1, S4,1, S1,3, S2,3 respectively represent the crosstalks among the ports, and the crosstalks in the passband are less than −13.2 dB. The above results indicate that the even-mode and the odd-mode signals can be transmitted with good performance through the same-frequency dual-mode transmission line of the present disclosure. Little crosstalks among the ports indicate that neither the odd-mode signals nor the even-mode signals are easily absorbed by unrelated ports during the transmission, that is, the odd-mode signal passes through the transmission path of the port 1, the balun signal pad, the balun, the spoof surface plasmon transmission line, the balun, the balun signal pad, and the port 2, and the even-mode signal passes through the transmission path of the port 3, the main feeding line pad, the ring line, the spoof surface plasmon transmission line, the ring line, the main feeding line, the main feeding line pad, and the port 4. The two paths are merely spatially overlapped on the spoof surface plasmon transmission line, and the odd-mode and even-mode signals are orthogonal to each other and independent, so that the odd-mode and the even-mode signals can pass through the spoof surface plasmon transmission line together, and are separated from each other at front and rear of the spoof surface plasmon transmission line to enter the corresponding feeding port respectively.

Figure 15:
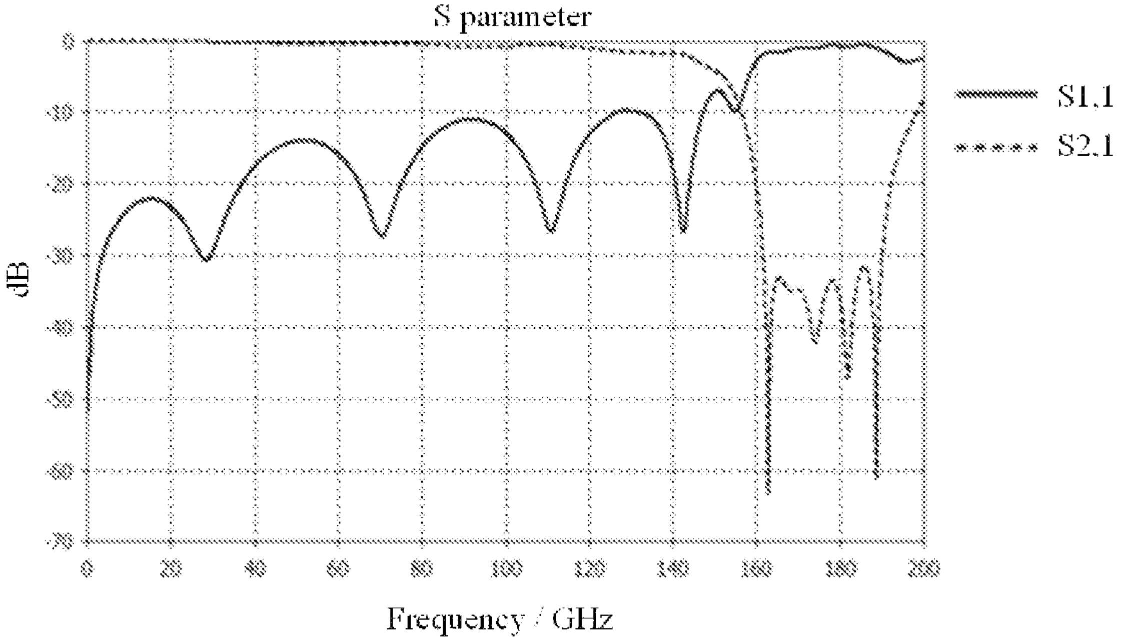
FIG. 15 illustrates the simulation result for the scattering parameters for the transmission lines in the dual-mode transmission line in the present disclosure, where the branch is the wave-shaped spoof surface plasmon unit.
Figure 16A:
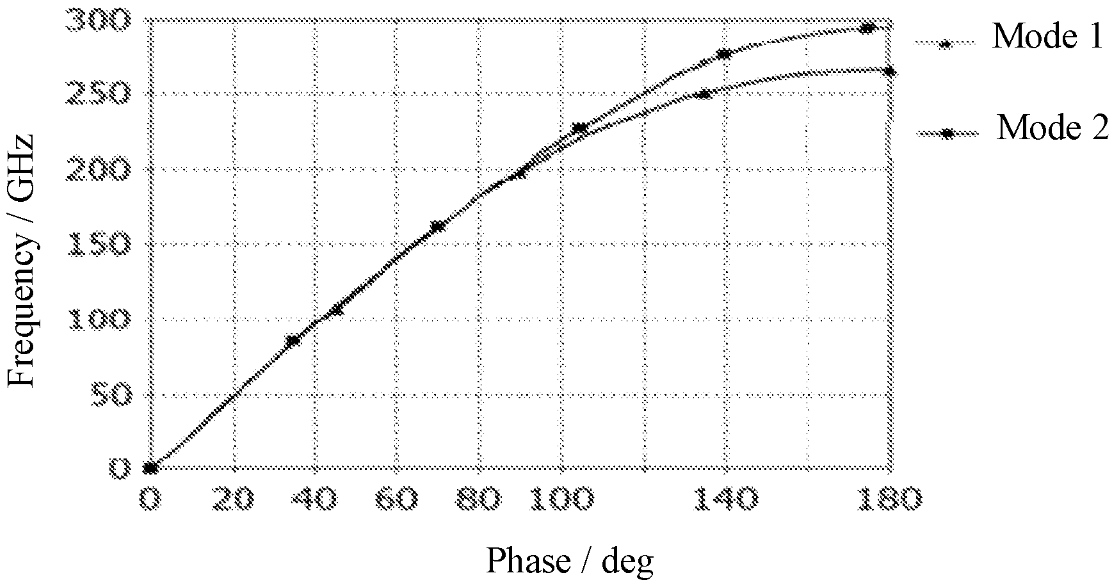
FIGS. 16(*a*) to 16(*e*) illustrate the simulation results for the branch in the dual-mode transmission line of the present disclosure, where the branch is the broken-line-shaped spoof surface plasmon unit, FIG. 16(*a*) illustrates the dispersion property of the broken-line-shaped spoof surface plasmon unit, FIG. 16(*b*) illustrates the scattering parameters for the even mode of the dual-mode transmission line, FIG. 16(*c*) illustrates the scattering parameters for the odd mode of the dual-mode transmission line, FIG. 16(*d*) illustrates the impedances for the even and the odd modes of the dual-mode transmission line, and FIG. 16(*e*) illustrates the wave impedances for the even and the odd modes of the dual-mode transmission line.
Figure 16B:
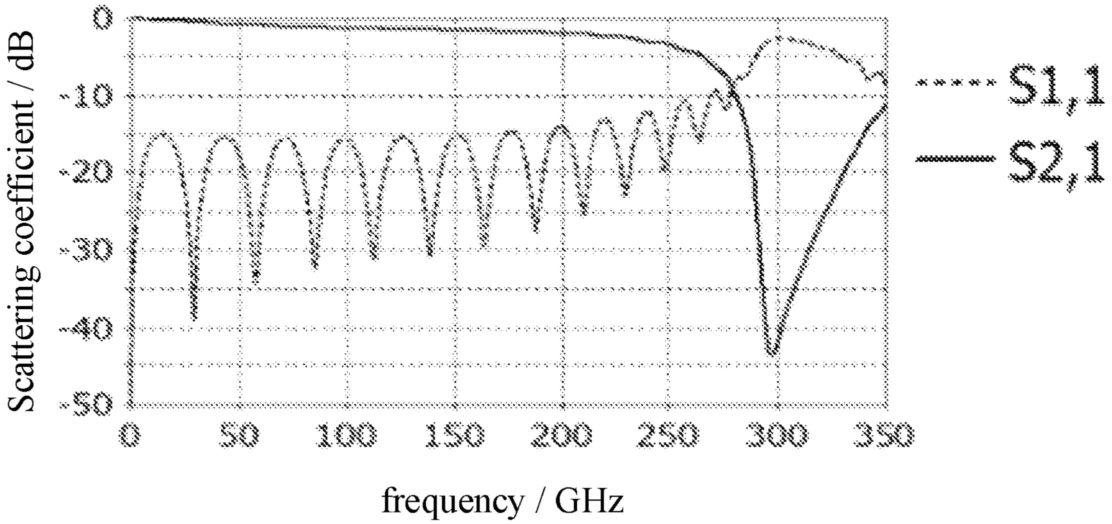
Figure 16C:
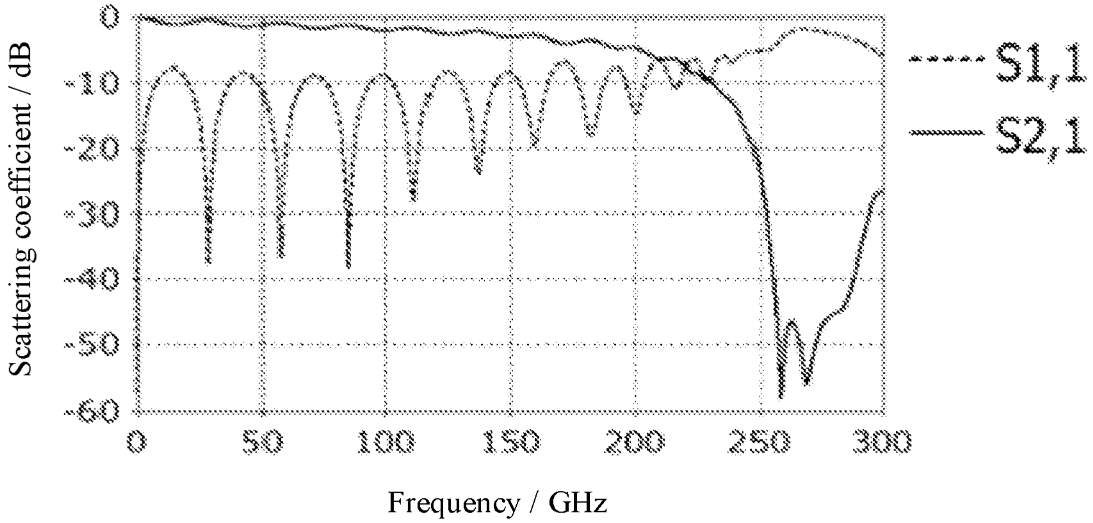
Figure 16D:
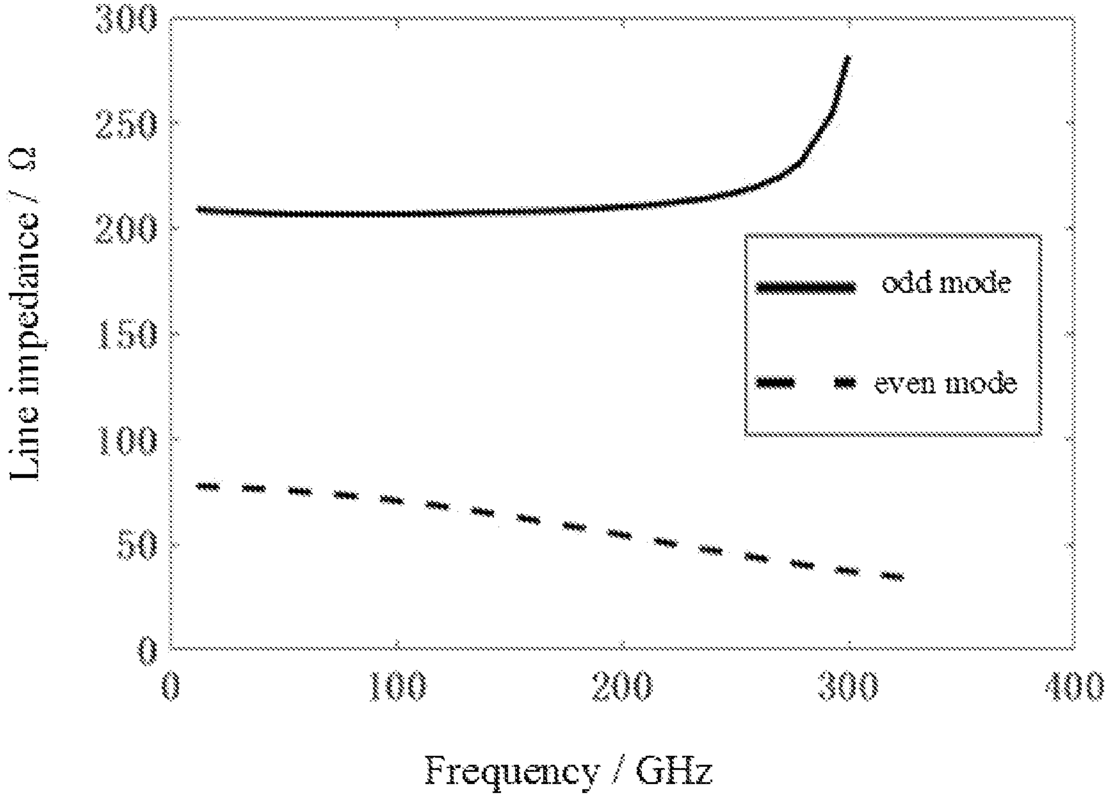
Figure 16E:
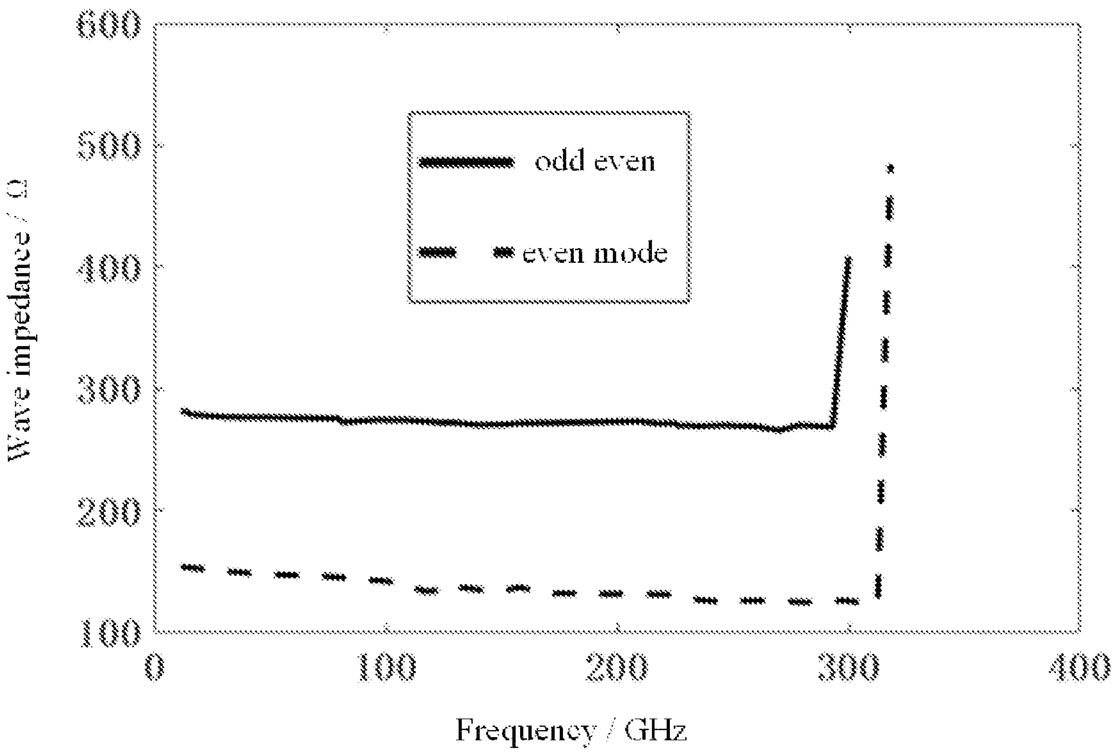
Figure 17A:
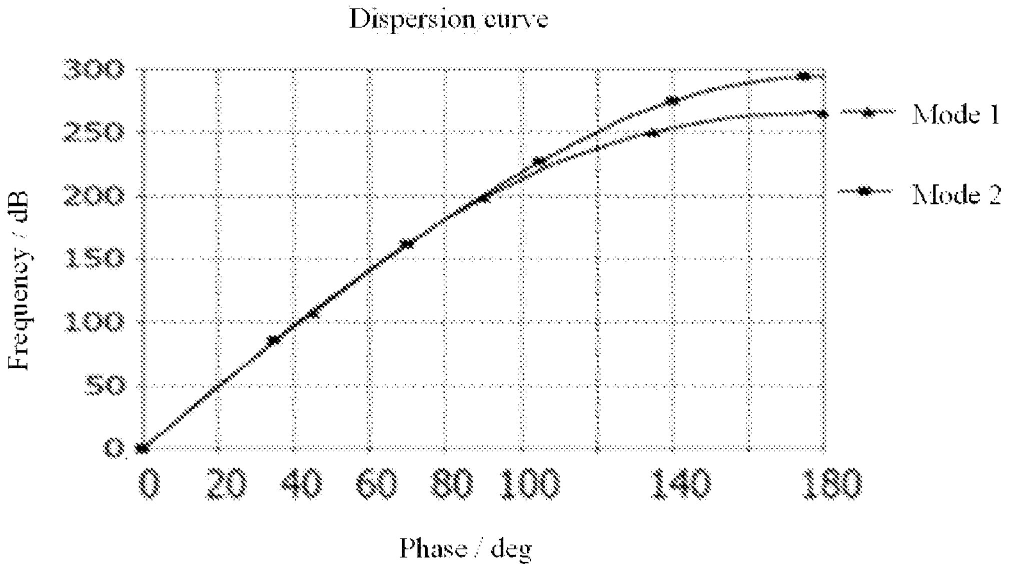
FIGS. 17(*a*) to 17(*b*) illustrate the simulate results for the branch in the dual-mode transmission line of the present disclosure, where the branch is the spring-shaped spoof surface plasmon unit.
Figure 17B:
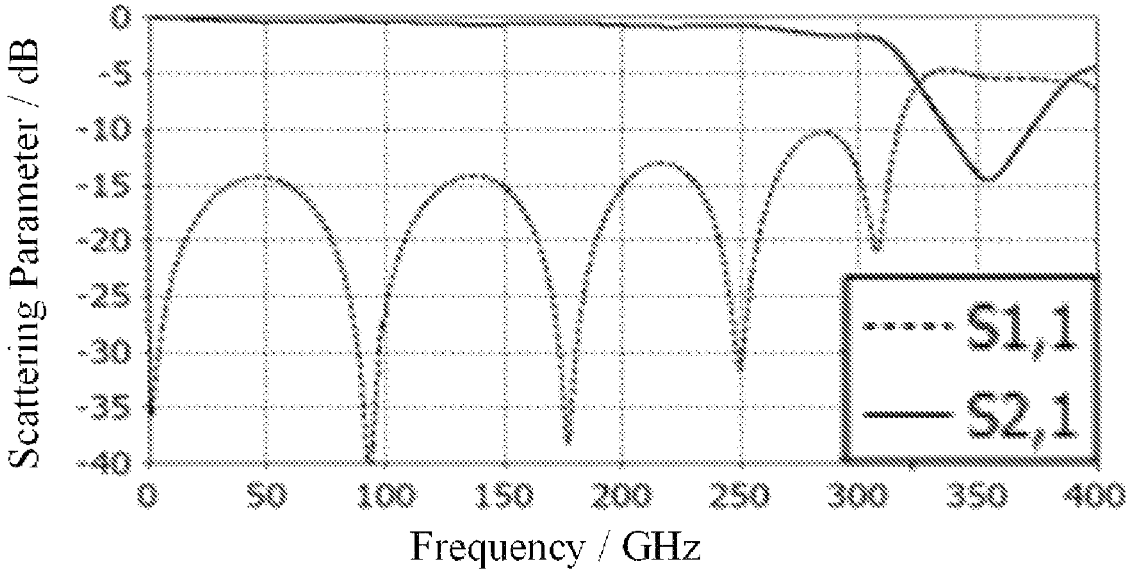
Figure 17C:
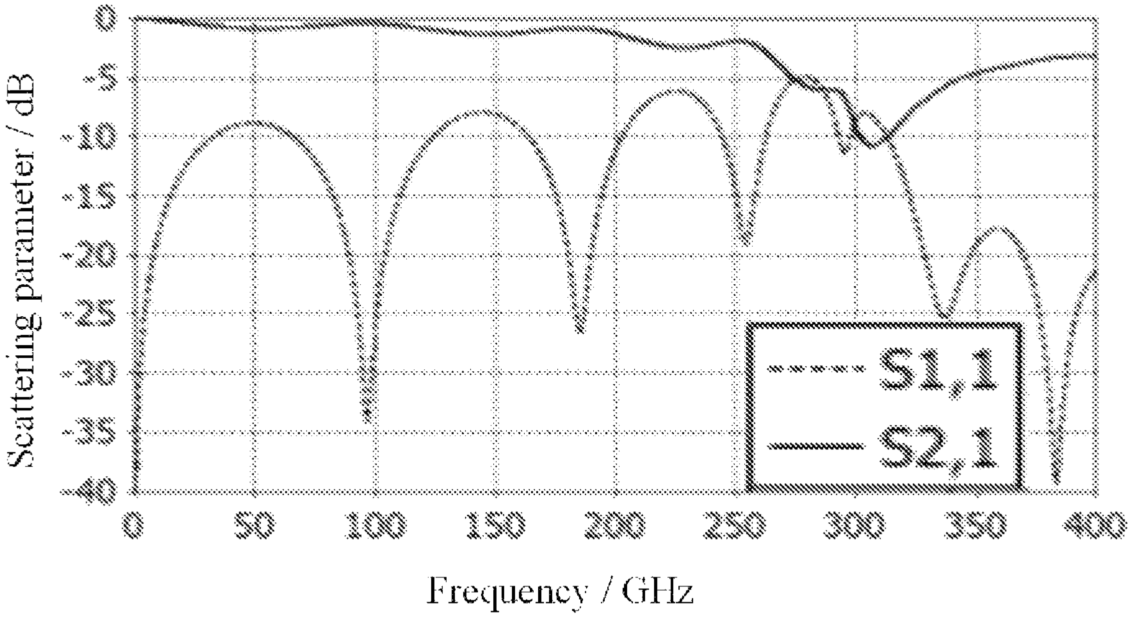
Figure 17D:
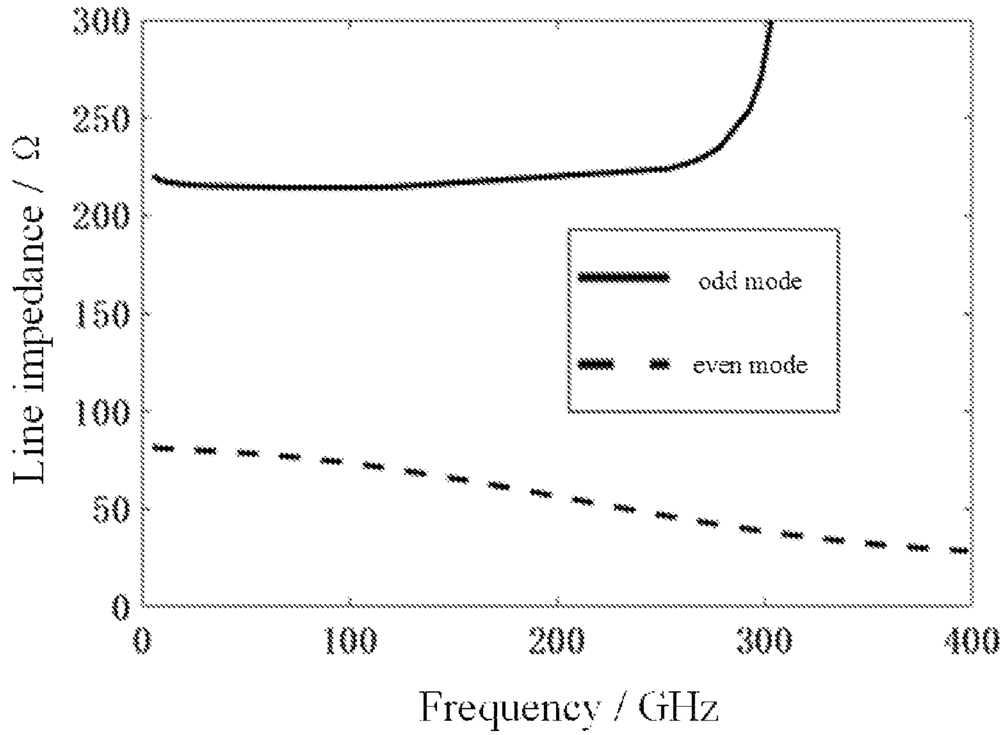
Figure 17E:
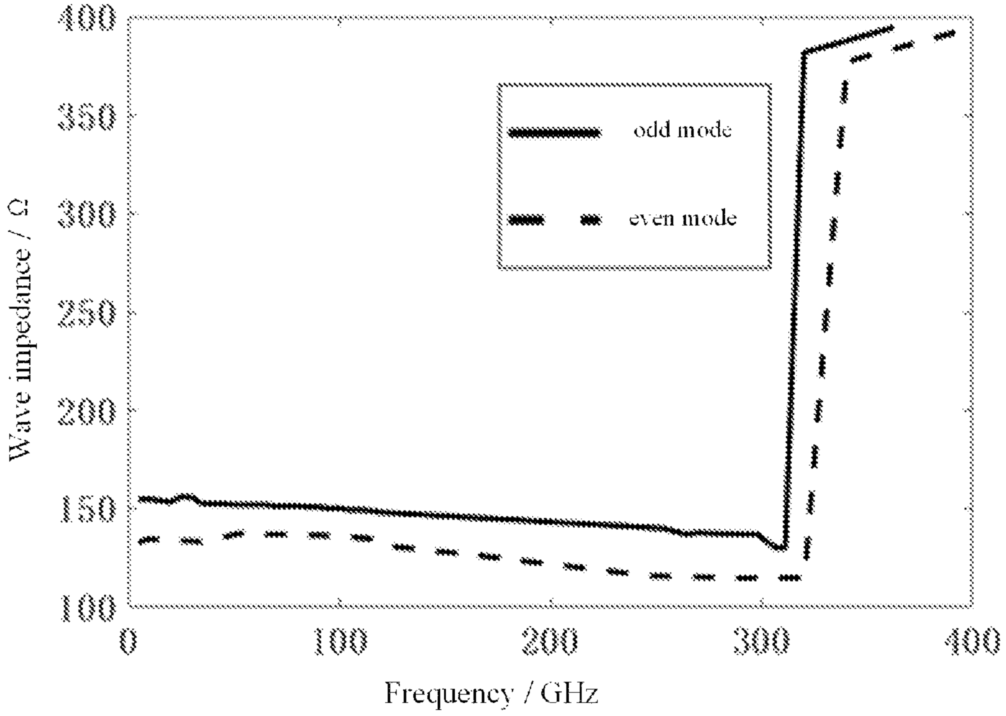

FIG. 15 illustrates the simulation results for the scattering parameters for the transmission line adopting the wave-shaped spoof surface plasmon unit as the branch in the dual-mode transmission line in the present disclosure. The reflection coefficient S1,1 is generally increased in a wave form with the increasing of the frequency, but the transmission coefficient S2,1 is decreased with the increasing of the frequency. The scattering parameters are affected by the dimension of the overall structure, including the dimensions of the metal strip line 4 and the wave-shaped spoof surface plasmon unit 130, the quantity of the periodic structures, the dimensions of the odd-mode signal pad 5 and the even-mode signal pad 6, as well as the distance between the odd-mode signal pad 5 and the odd-mode signal pad 6. In a range of 0 GHz to 140 GHz, the reflection coefficient S1,1 is less than −9.8 dB, and the transmission coefficient S2,1 is more than −1.8 dB. As illustrated in the figure, the transmission cut-off characteristic of the transmission line is generated around 163 GHz.

FIGS. 16(*a*) to 16(*e*) illustrate the simulation results for the broken-line-shaped spoof surface plasmon as the branch in the dual-mode transmission line of the present disclosure. The dispersion property for the broken-line-shaped spoof surface plasmon unit is as illustrated in FIG. 16(*a*), the dispersion curves of Mode 1 and Mode 2 are extremely similar in a range of 0 GHz to 200 GHz, and the cut-off frequencies for the Mode 1 and the Mode 2 are both less than 300 GHz. The Mode 1 corresponds to the odd mode, the Mode 2 corresponds to the even mode, and the mode electric fields of the Mode 1 and the Mode 2 are illustrated in FIG. 16(*a*). The scattering parameter for the even mode in the dual-mode transmission line are as illustrated in FIG. 16(*b*), the transmission efficiency is gradually deteriorated with the increasing of the frequency. In the range of 0 GHz to 235 GHz, the transmission coefficient S2,1 is remained more than −3 dB, and the return loss S1,1 is permanently less than −10 dB, and the transmission coefficient is decreased sharply proximity to the cut-off frequency of the even mode, and the transmission is cut off. The scattering parameter for the odd mode of the dual-mode transmission line is as illustrated in FIG. 16(*c*), in a range of 0 GHz to 150 GHz, the transmission coefficient S2,1 is remained more than −3 dB and the return loss S1,1 is more than −10 dB in certain frequency bands. On the odd and even mode transmission line, the input impedance is changed caused by the different filed modes, so that the efficiency is decreased caused by the mismatched impedance. The impedances for the odd mode and the even mode of the dual-mode transmission line are as illustrated in FIG. 16(*d*), the line impedance for the odd mode has a tendency to increase with the increasing of the frequency, but the line impedance for the even mode has a tendency to decrease with the increase of frequency, the main reason is that the capacitive coupling between the main lines is not generated in the odd-mode excitation condition but merely generated in the even-mode excitation condition. In addition, the frequency at which the line impedance for the odd mode is turned significantly corresponds to the cut-off frequency for the Mode 1. The line impedance for the odd mode rises sharply above 260 GHz, while the line impedance for the even mode does not changes as significantly as the odd mode due to being at a relatively low level. The wave impedances for the odd mode and the even mode of the dual-mode transmission line are as illustrated in FIG. 16(*e*). Due to the characteristic of the spoof surface plasmon, the TM mode electromagnetic field is transmitted on the transmission line. The reason for the significant increase in wave impedance in the figure is that the energy of the transverse magnetic field is rapidly decayed, the electromagnetic field cannot be transmitted smoothly, which is correspondingly related to the decrease of S2,1 in the scattering parameter results, and also means that the transmission is cut off.

FIGS. 17(*a*) to 17(*e*) illustrate the simulation results for the branch in the dual-mode transmission line of the present disclosure, where the branch is the spring-shaped spoof surface plasmon unit. FIG. 17(*a*) illustrates the dispersion property of the spring-shaped spoof surface plasmon unit, the dispersion curves of the Mode 1 and the Mode 2 are cut off at 267 GHz and 296 GHz, respectively. The mode electric field distribution diagram illustrates that the Mode 1 corresponds to the odd mode, and the electric field distribution has the anti-phase characteristic, and the Mode 2 corresponds to the even mode, and the electric field distribution is symmetrical. FIG. 17(*b*) illustrates the scattering parameter for the even mode of the dual-mode transmission line, in a range of 0 GHz to 300 GHz, the transmission coefficient S2,1 is remained more than −1.7 dB, and the return loss S1,1 is permanently less than −10 dB. FIG. 17(*c*) illustrates the scattering parameter for the odd mode of the dual-mode transmission line, in a range of 0 GHz to 200 GHz, the transmission coefficient S2,1 is remained more than −1.7 dB, and the return loss S1,1 is permanently less than −7.96 dB. FIG. 17(*d*) illustrates the line impedances for the odd mode and the even mode of the dual-mode transmission line. The line impedance for the odd mode has a tendency to increase with the increasing of the frequency, but the line impedance for the even mode has a tendency to decrease with the increasing of frequency, the main reason is that the capacitive coupling between the main lines is not generated in the odd-mode excitation condition, but merely generated in the even-mode excitation condition. In addition, the frequency at which the line impedance for the odd-mode is turned significantly corresponds to the cut-off frequency for the Mode 1. The line impedance for the odd mode rises sharply in the line impedance above 260 GHz, while the line impedance for the even mode does not change as significantly as the odd mode due to being at a relatively low level. The wave impedances for the odd mode and the even mode of the dual-mode transmission line are as illustrated in FIG. 17(*e*). Due to the characteristic of the spoof surface plasmon, the TM mode electromagnetic field is transmitted on the transmission line. The reason for the significant increase in wave impedance in the figure is that the energy of the transverse magnetic field is rapidly decayed, the electromagnetic field cannot be transmitted smoothly, which is correspondingly related to the decrease of S2,1 in the scattering parameter results, and also means that the transmission is cut off.

Figure 18:
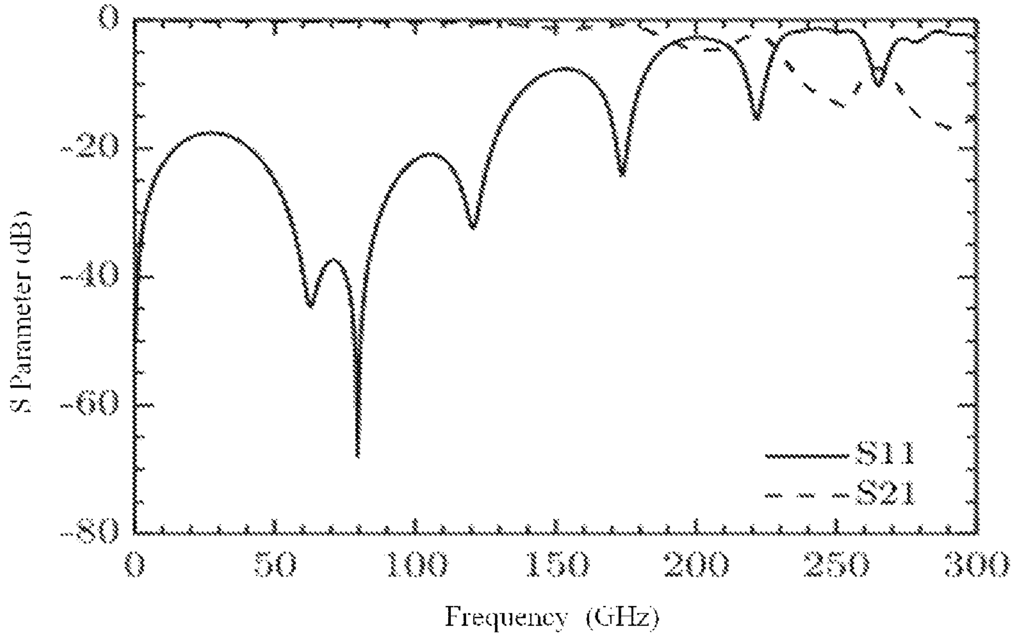
FIG. 18 illustrates the scattering parameters for the transmission line in the dual-mode transmission line in the present disclosure, where the branch is the butterfly-shaped spoof surface plasmon unit.

FIG. 18 illustrates the scattering parameters for the transmission line in the dual-mode transmission line in the present disclosure, where the branch is the butterfly-shaped artificial plasmon unit. The dual-mode transmission line formed by the butterfly-shape spoof surface plasmon unit 140 and the metal strip line 4 is within a range of 0 GHz to 180 GHz, the transmission coefficient S21 is more than −2.4 dB, and the return loss coefficient S11 is less than −10 dB.

Figure 19:
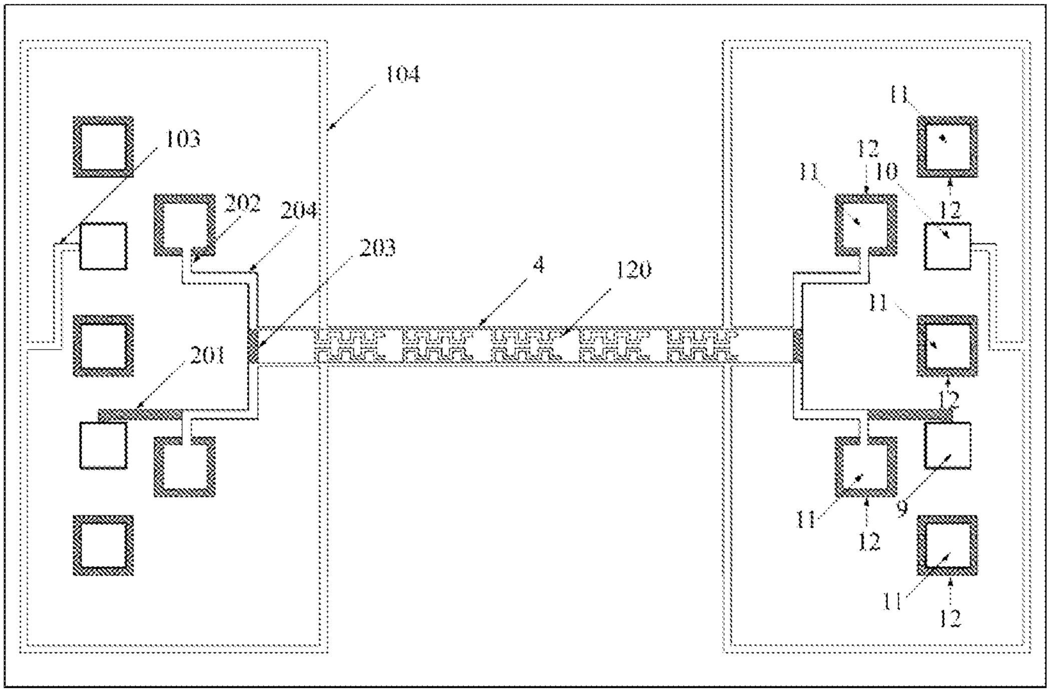
FIG. 19 illustrates the on-chip dual-mode transmission line with the spoof surface plasmon based on the balun in the present disclosure, where the branch of the dual-mode transmission line is the broken-line-shaped spoof surface plasmon unit.

FIG. 19 illustrates the top view of the further modification of the balun and the pads in the on-chip dual-mode transmission line with the spoof surface plasmon based on the balun, where the branch of the dual-mode transmission line is the broken-line-shaped spoof surface plasmon unit. The right-angle strip-shaped input line 201 is located above the dielectric material 2, and is a metal strip line with a bent of 90°. The width of the right-angle strip-shape input line 201 is kept the same before and after bending, and one terminal of the right-angle strip-shaped input line 201 is connected to the lower plate 13 below the odd-mode probe pad 9, and the other terminal of the right-angle strip-shaped input line 201 is connected to a port of the lower metal frame 203. The lower metal frame 203 is formed by removing one longer side of a square frame. One terminal of the lower metal frame 203 approximate to the odd-mode probe pad 9 is connected to the right-angle strip-shaped input line 201, and the other terminal of the lower metal frame 203 is suspended in midair. The upper metal frame 204 is a square frame by removing one longer side and a portion at an intermediate of the other longer side, and the remaining portion of the square frame is directly opposite to the lower metal frame 203 to form a coupling. The tail terminal of the upper metal frame 204 is suspended in midair. The ports of the upper metal frame 204 approximate to ground probe pads 11 are respectively connected to the ground probe pads on both sides of the balun by the balun grounding transition line 202, and the ports of the upper metal frame 204 approximate to the metal strip lines 4 are respectively connected at the side of the metal strip lines 4. The odd-mode signal pad 5, the even-mode signal pad 6, the ground probe pad 11, and the lower small flat plate 13 all have an area of 70 um×70 um, the lower large plate 12 has an area of 90 um×90 um, and the back metallization via has an area of 50 um×50 um.

Figure 20:
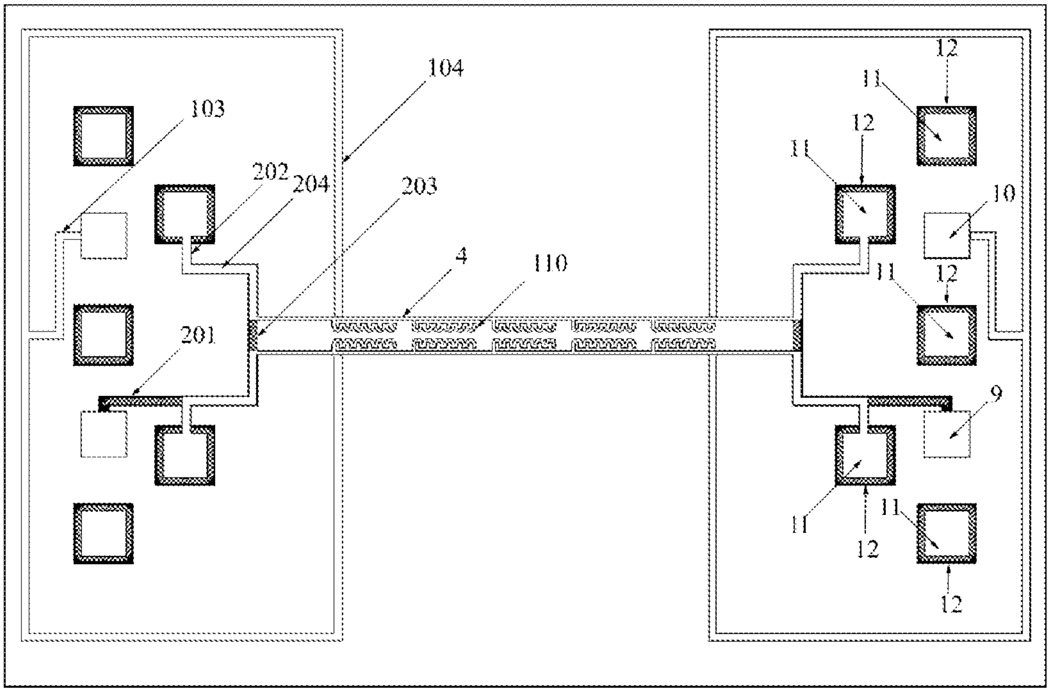
FIG. 20 illustrates the on-chip dual-mode transmission line with the spoof surface plasmon based on the balun in the present disclosure, where the branch of the dual-mode transmission line is the spring-shaped spoof surface plasmon unit.

FIG. 20 illustrates a top view of the further modification of the balun and the pads structure of the on-chip dual-mode transmission with the spoof surface plasmon based on the balun in the present disclosure, where the branch of the dual-mode transmission line is the spring-shaped spoof surface plasmon unit.

Figure 21:
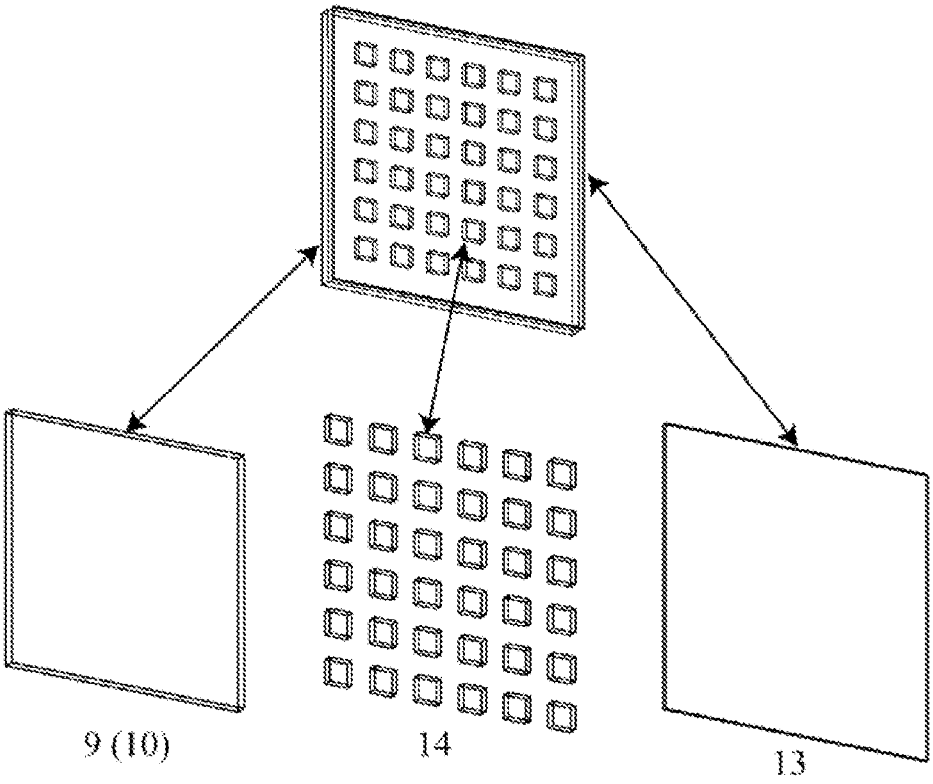
FIG. 21 illustrates a schematic diagram and an analysis diagram of the odd-mode probe pad, the even-mode probe pad, the lower small plate, and the small-scale metal vias in the present disclosure.

FIG. 21 illustrates the schematic diagram and the analysis diagram of the odd-mode probe pad, the even-mode probe pad, the lower small plate and the small-scale metal vias in the present disclosure. The odd-mode probe pad 9 is located above the dielectric adhesive 1, the lower plate 13 with the same area of the odd-mode probe pad is located above the dielectric material 2, and the small-scale metal vias 14 are a 6×6 array composed of a group of metal cuboids with a side length of 5 um, a spacing of 5 um, and a height of 1.8 um. The small-scale metal vias 14 are located inside the dielectric adhesive 1 between the odd-mode probe pad 9 and the lower small plate 13 to connect the odd-mode probe pad 9 and the lower small plate 13. The even-mode probe pad 10 is the same as the odd-mode probe pad 9.

Figure 22:
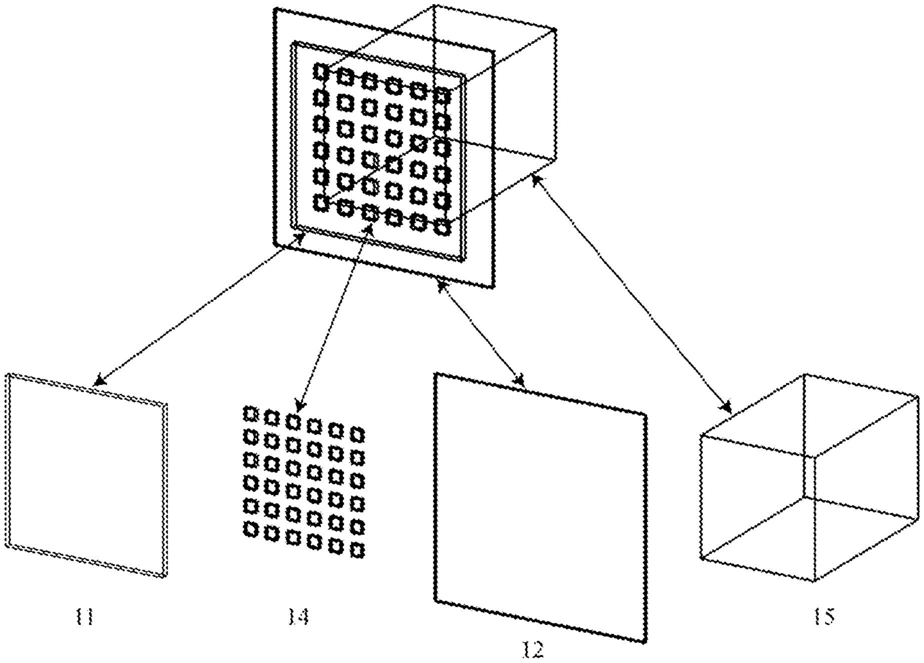
FIG. 22 illustrates a schematic diagram and an analysis diagram of the ground probe pad, the lower large plate, the small-scale metal vias, and the back metallic via in the present disclosure.

FIG. 22 illustrates the schematic diagram and the analysis diagram of the ground probe pad, the lower large plate, the small-scale metal vias, and the back metallic vias of the present disclosure. The ground probe pad 11 is in communication with the lower large plate 12 through the small-scale metal vias 14, and the cuboid-back metallic via 15 is configured to communicate the lower large plate 12 with the metal ground structure 3.

Figure 23:
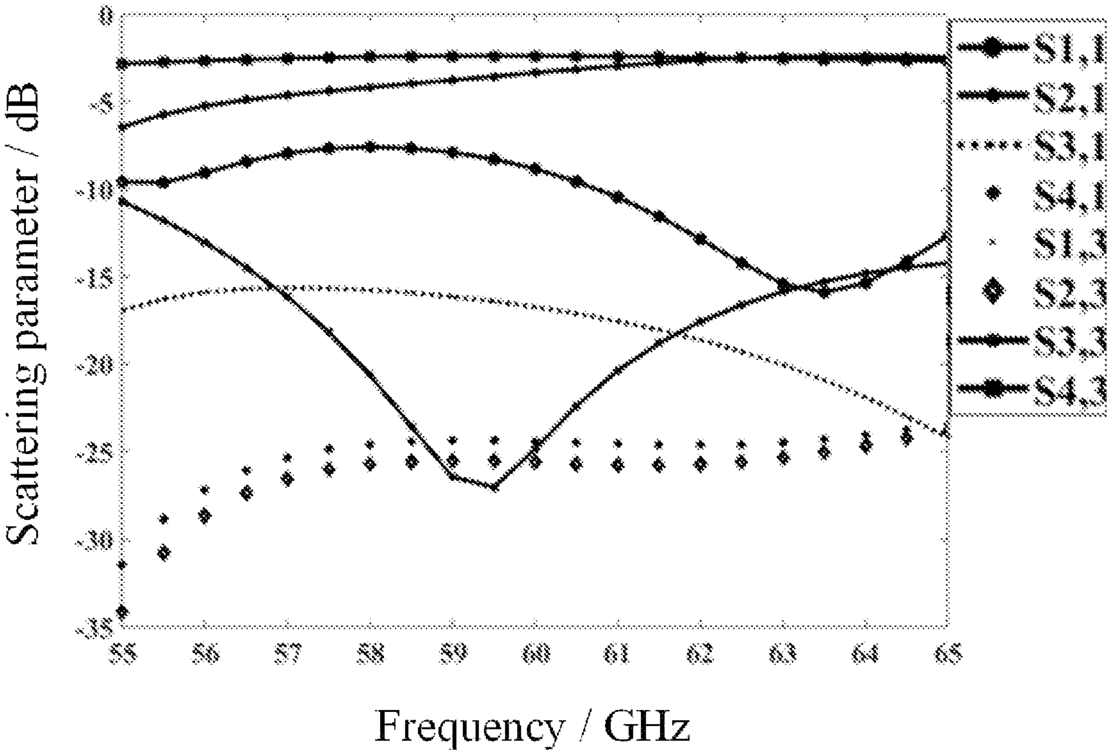
FIG. 23 illustrates the result for the scattering parameters that are obtained by further modifying the structures of the balun and the pads in the on-chip dual-mode transmission line with the spoof surface plasmon based on the balun in the present disclosure, where the branch in the dual-mode transmission line is the broken-line-shaped spoof surface plasmon unit.

FIG. 23 illustrates the result for the scattering parameters that are obtained by further modifying the structures of the balun and the pads in the on-chip dual-mode transmission line with the spoof surface plasmon based on the balun of the present disclosure, where the branch in the dual-mode transmission line is the broken-line-shaped spoof surface plasmon unit. S2,1 denotes the transmission coefficient for the odd mode, S1,1 denotes the reflection coefficient for the odd mode, in the frequency range of 60.75 GHz to 65 GHz, S2,1 is more than −3 dB, the peak value of S2,1 is −2.38 dB, and S1,1 is less than −10 dB. S4,3 denotes the transmission coefficient for the even mode, S3,3 denotes reflection coefficient for the even mode, in a range of 55 GHz to 65 GHz, S4,3 is more than −2.8 dB, and S3,3 is less than −10 dB. The crosstalks among the ports are less than −15 dB, which indicates that the isolation is well.

Figure 24:
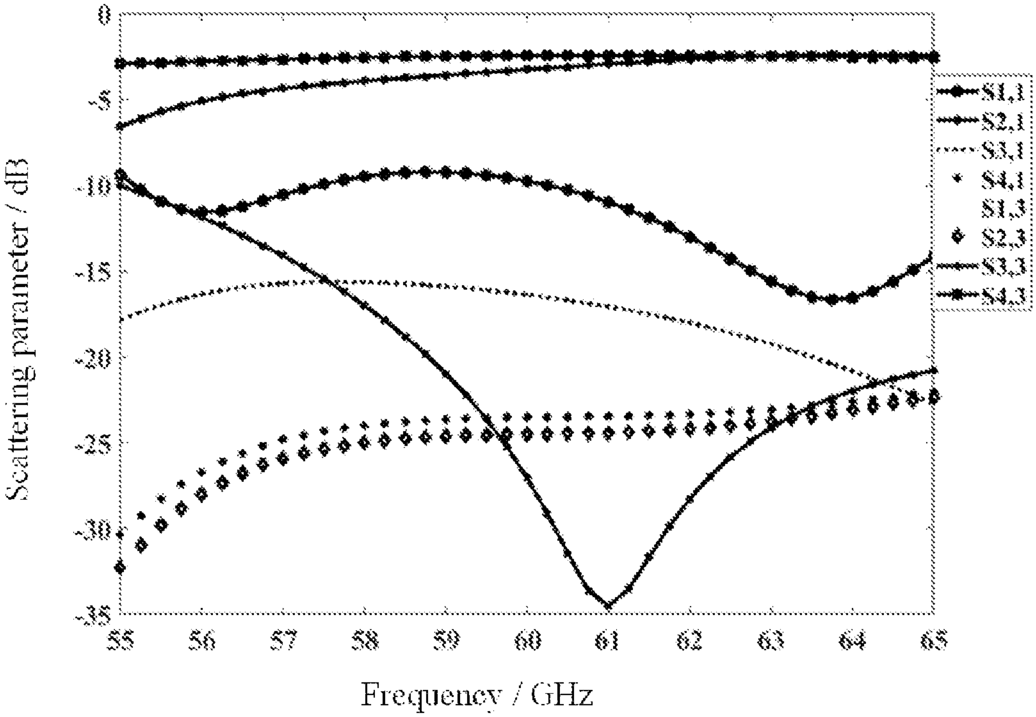
FIG. 24 illustrates the result for the scattering parameters that are obtained by further modifying the structures of the balun and the pads in the on-chip dual-mode transmission line with the spoof surface plasmon based on the balun in the present disclosure, where the branch in the dual-mode transmission line is the spring-shaped spoof surface plasmon unit.

FIG. 24 illustrates the result for the scattering parameters that are obtained by further modifying the structures of the balun and the pads in the on-chip dual-mode transmission line with the spoof surface plasmon based on the balun of the present disclosure, where the branch in the dual-mode transmission line is the spring-shaped spoof surface plasmon unit. S2,1 denotes the transmission coefficient for the odd mode, S1,1 denotes the reflection coefficient for the odd mode, in the frequency range of 60 GHz to 65 GHz, S2,1 is more than −3.2 dB, the peak value of S2,1 is −2.39 dB, and S1,1 is less than −10 dB. S4,3 denotes the transmission coefficient for the even mode, S3,3 denotes reflection coefficient for the even mode, in a range of 55 GHz to 65 GHz, S4,3 is more than −2.9 dB, and S3,3 is less than −10 dB. The crosstalks among the ports are lower than −15 dB, which indicates that the isolation is well.

Figure 25:
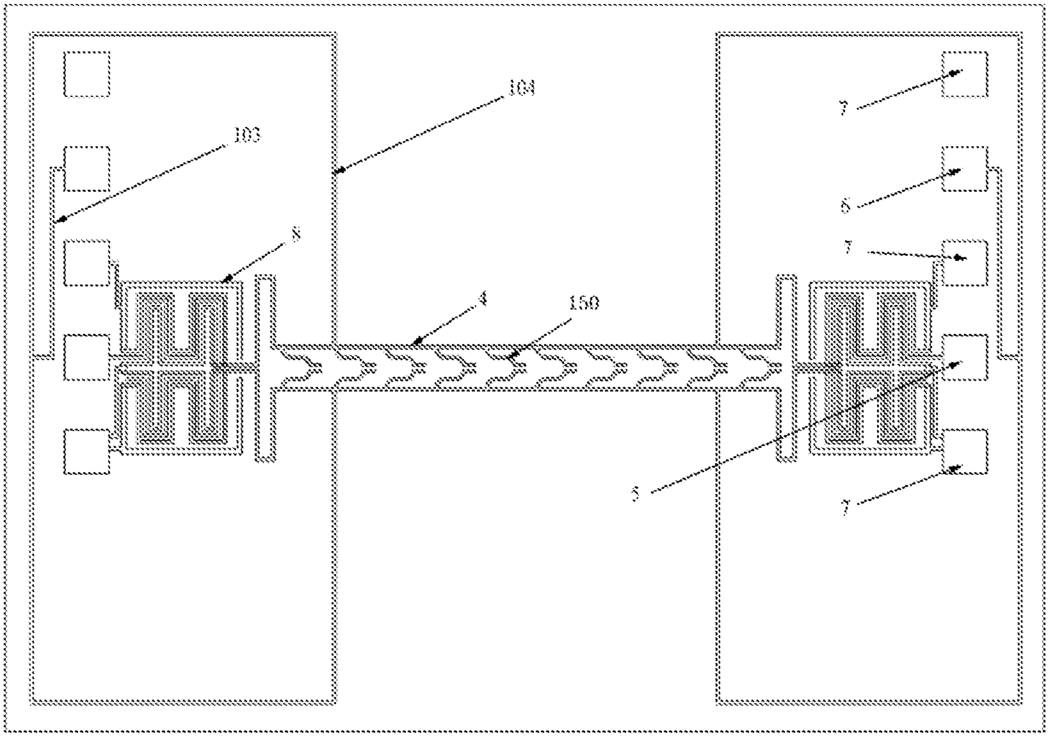
FIG. 25 illustrates a top view of the dual-mode transmission line of the spoof surface plasmon based on the bird-shaped unit in the present disclosure, including two symmetrical triple-conductor edge-coupled balun structure.

FIG. 25 illustrates the dual-mode transmission line of the spoof surface plasmon base on the bird-shaped unit of the present disclosure including two symmetrical triple-conductor edge-coupled baluns 8, the four-port grounding terminals 7 and the odd-mode signal pads 5 are connected to the balun input terminals, which plays the role of the feeding and the grounding. The main feeding line 103 is led out through the even-mode signal pad 6 and connected at the center of the longer side of the ring line 104, and the ring line 104 is symmetrically connected to both sides of the metal strip line 4. The balun output port 90 of the triple-conductor edge-coupled balun 8 is connected to the metal strip line 4. The bird-shaped spoof surface plasmon unit 150 is adopted as the branches in the dual-mode transmission line. The bird-shaped spoof surface plasmon unit includes a plurality of structures placed in a region between the two metal strip lines 4 parallel to each other and arranged periodically along a length direction of the metal strip line 4. The bird-shaped spoof surface plasmon unit 150 is a structure of two bird-shaped spoof surface plasmon units that are in mirror symmetry. Each of the bird-shaped spoof surface plasmon units 150 includes a quarter ring that one port of the quarter ring is connected at the side of the metal strip line 4, and the other port of the quarter ring is connected to one terminal of one straight segment, the other terminal of the straight segment is connected to a same quarter ring, and eventually the other terminal of the quarter ring is connected to another straight segment, and the other terminal of the straight segment is suspended in midair. The bird-shaped spoof surface plasmon unit 150 is placed between the two metal strip lines 4 and is symmetrical about the central axis, and one terminal of the bird-shaped surface plasmon unit 150 is connected to the metal strip line 4. By changing the spacing between the adjacent coupling lines in the triple-conductor edge-coupled balun 8, within the allowable range of the process, the smaller the spacing between the adjacent coupling lines is, the wider the working bandwidth that the entire transmission line can achieve is. By adjusting the position where the ring line 104 is connected to the metal strip line 4 and the length of the ring line 104, and the working frequency band of the transmission line can be adjusted according to the actual needs to satisfy the actual needs of the different frequency bands. By adjusting the above parameters, the dual-mode transmission line with the spoof surface plasmon can achieve the effect of dual-mode transmission in each frequency band of the microwave and the millimeter wave.

Figure 26:
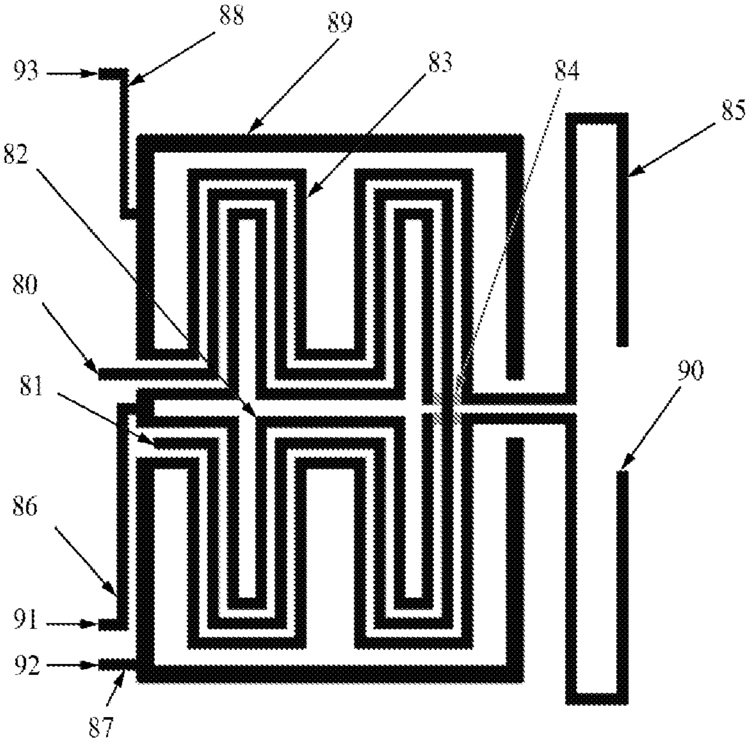
FIG. 26 illustrates an analytical diagram of the triple-conductor edge-coupled balun line and the port.

FIG. 26 illustrates the analytic diagram of the lines and the ports of the triple-conductor edge-coupled balun 8. In the triple-conductor edge-coupled balun 8, a triple-conductor edge-coupled balun main body includes a triple-conductor structure formed by the excitation strip line 81, the internal coupling line 82 and the external coupling line 83. The excitation strip line 81, the internal coupling line 82 and the external coupling line 83 are all placed above the dielectric adhesive 1. The excitation strip line 81 is a metal strip line bent multiple times, one terminal of the excitation strip line 81 is connected to the odd-mode signal pad 5 through the odd-mode signal input port 80, and the other terminal of the excitation strip line is suspended in midair. The internal coupling line 82 is two symmetrical metal strip lines placed on the inward side of the excitation strip line 81. The external coupling line 83 is two symmetrical metal strip lines placed outside the excitation strip line 81. One terminal of the cross-layer composite line 84 is initiated from the tail terminal of the internal coupling line 82, firstly extended downward towards the bottom portion of the dielectric adhesive 1, then extended parallel to the bottom portion of the dielectric adhesive 1 after being bent at 90 degrees, subsequently passing under the excitation strip line 81, until being reached under the tail terminal of the external coupling line 83, then the cross-layer composite line 84 is extended upwards to connect the tail terminal of the external coupling line 83, thereby converging the signals on the internal coupling line 82 and the external coupling line 83 into one path signal that is outputted from the balun output port 90 through the composite output line 85. The internal coupling line 82 is divided into two meander lines that are symmetrical about the central axis of the structure. The other terminals of the internal coupling lines 82 are jointly connected to one terminal of the internal line grounding line 86, and is connected to the four-port grounding terminal 7 through the internal coupling line grounding port 91 at the other terminal of the internal line grounding line 86.

The metal protective ring wall 89 is two segments of C-shaped metal walls symmetrically distributed outside the external coupling line 83. The bottom of the C-shaped metal wall is in contact with the metal ground structure 3, and one terminal of the external coupling line 83 is connected to the metal protective ring wall 89. The lower grounding line 87 and the upper grounding line 88 are led out from the two segments of the metal protection ring wall 89 respectively, and are respectively connected to the adjacent four-port grounding terminal 7 through the lower grounding port 92 and the upper grounding port 93.

Figure 27:
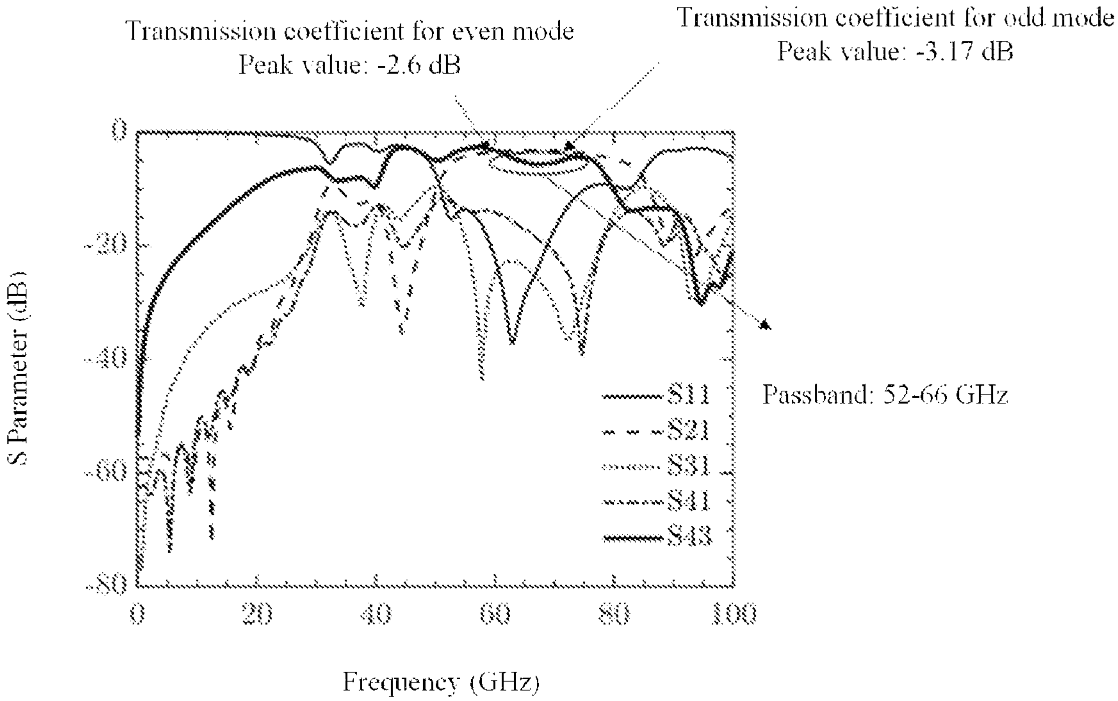
FIG. 27 illustrates the scattering parameters for the dual-mode transmission line with the spoof surface plasmon based on the bird-shaped unit.

FIG. 27 illustrates the scattering parameters for the dual-mode transmission line with the spoof surface plasmon based on the bird-shaped unit. In the case of the pad excitation, it can be seen that, in the communication frequency band of 59 GHz to 64 GHZ, the reflection coefficient S11 of one port is permanently less than −15 dB, the transmission coefficient S21 of the odd mode and the transmission coefficient S43 of the even mode are also more than −5 dB, which has a characteristics of good transmission. And it can be seen that the transmission coefficients between port 1 and port 3, port 2 and port 4 are all less than −20 dB, which has low crosstalks.

Figure 28:
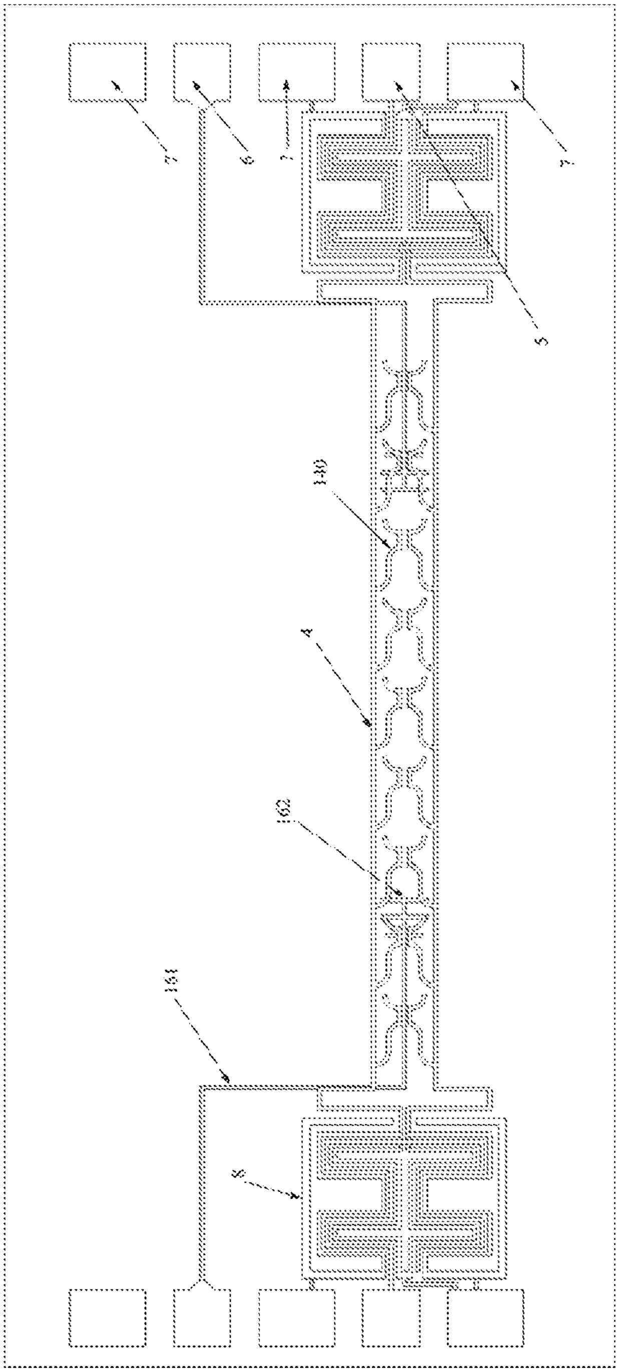
FIG. 28 illustrates a schematic diagram of a structure which adopts the antenna lead 161 and the cross-layer coupling antenna 162 for transmitting.

FIG. 28 illustrates the schematic diagram of the structure adopting the antenna lead 16 and the cross-coupling antenna 162 for transmission. The even mode signal is transmitted through the antenna lead 161 and the cross-layer coupling antenna 162 above the dielectric material 2, rather than the main feeding line 103 and the ring line 104. The antenna lead 161 is led out from the even-mode signal pad 6, and reached under the metal strip line 4 and the butterfly-shaped spoof surface plasmon unit 140 through two bendings of 90° in a strip-shaped line after passing through the trapezoidal transition section. The cross-layer coupling antenna 162 is located at the tail terminal of the antenna lead 161, which is a set of strip-shaped lines with equal distance and unequal lengths and are arranged horizontally on the antenna lead 161 to form a transmitting antenna shaped like a "丰", so that the signals on the transmitting antenna is coupled transmitted to the upper structure.

Figure 29:
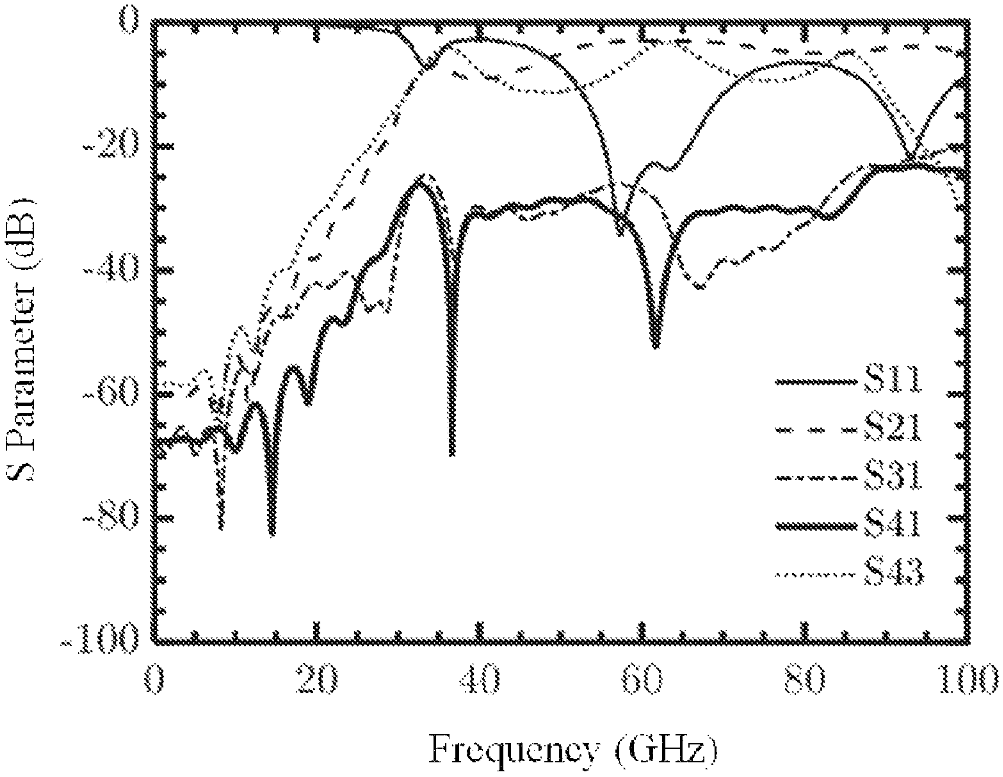
FIG. 29 illustrates the reflection coefficient and transmission coefficient for the structure as illustrated in FIG. 28.

FIG. 29 illustrates the structure as illustrated in FIG. 28, where the reflection coefficient and the transmission coefficient are within the communication range of 59 GHz to 64 GHz, the reflection coefficient S11 is less than −20 dB, the odd-mode transmission coefficient S21 reaches −3 dB, and the even-mode transmission coefficient S43 is more than −5 dB. The transmission coefficients S31 and S41 reflecting the degree of the coupling between the ports are also less than −25 dB, which indicates that the good isolation and the low crosstalk are between the ports.

The above descriptions are merely preferred embodiments of the present disclosure. It should be pointed out that for those of ordinary skill in the art, a plurality of improvements and embellishments can be made without departing from the principles of the present disclosure, and these improvements and embellishments should also be regarded as the protection scope of the present disclosure.

What is claimed is:

1. An on-chip dual-mode transmission line with an spoof surface plasmon based on a balun, wherein a dual-mode transmission line structure comprises a dielectric adhesive, a dielectric material, a metal ground structure, metal strip lines, odd-mode signal pads, even-mode signal pads, four-port grounding terminals, and a dual-mode transmission line located in an intermediate of the dual-mode transmission line structure, a balun structure symmetrically located at both terminals of the dual-mode transmission line, and a pad feeding structure located outside each of the balun structure; the dual-mode transmission line includes two metal strip lines parallel to each other and branches located between the two metal strip lines; each of the balun structure is formed by coupling two layers of metal structures, including upper metal meander lines, a lower metal meander line, a main feeding line, and a metal connection line; pads of each of the pad feeding structure include the odd-mode signal pad, the even-mode signal pad and the four-port grounding terminals, each of the four-port grounding terminals is in a cuboid metal via structure, and is configured to connect a metal layer where the dual-mode transmission line is located with the metal ground structure covered under the dielectric material; connection lines of each of the pad feeding structure are signal connection lines led out from the odd-mode signal pad and the even-mode signal pad, including the metal connection line and the main feeding line; the lower metal meander line is in a C-shape, the odd-mode signal pad is connected to one terminal of the lower metal meander line through the metal connection line, and the even-mode signal pad is connected to a ring line through the main feeding line; the two metal strip lines are respectively connected at openings of each of the ring lines, and both ports of each of the two metal strip lines are respectively connected to an inward port of each of the upper metal meander lines, the inward port is a port facing towards an intermediate of the transmission line structure; two outward ports of the two upper metal meander lines are suspended in midair.

2. The on-chip dual-mode transmission line with the spoof surface plasmon based on the balun according to claim 1, wherein the balun structure further has a second structure, that is, the two inward ports facing towards the intermediate of the transmission line structure of the two upper metal meander lines are respectively connected to the two metal strip lines, and the two outward ports of the two upper metal meander lines are respectively connected to a same four-port grounding terminal located in an intermediate of the pad feeding structure through balun grounding lines, one terminal of the lower metal meander line is connected to the odd-mode signal pad through a tapered balun input terminal structure, and another terminal of the lower metal meander line is suspended in midair.

3. The on-chip dual-mode transmission line with the spoof surface plasmon based on the balun according to claim 1, wherein the balun structure further has a third structure, that is, the two inward ports facing towards the intermediate of the transmission line structure of the two upper metal meander lines are respectively connected to the two metal strip lines, or respectively connected to the two metal strip lines through quarter rings and trapezoidal connection blocks, two outward ports of the two upper metal meander lines are connected to two four-port grounding terminals through balun grounding lines, one terminal of the lower metal meander line is connected to the odd-mode signal pad through a tapered balun input terminal structure and another terminal of the lower metal meander line is suspended in midair.

4. The on-chip dual-mode transmission line with the spoof surface plasmon based on the balun according to claim 1, wherein the balun structure further has a fourth structure that is a triple-conductor edge-coupled balun structure, with output ports of two symmetrical triple-conductor edge-coupled baluns respectively connected to both terminals of each of the metal strip lines; a triple-conductor edge-coupled balun main body includes a triple-conductor structure formed by an excitation strip line, an internal coupling line and an external coupling line, and the excitation strip line, the internal coupling line and the external coupling line are all placed above the dielectric adhesive; the excitation strip line is a metal strip line bent in multiple times, one terminal of the excitation strip line is connected to the odd-mode signal pad through the odd-mode signal input port, and another terminal of the excitation strip line is suspended in midair; the internal coupling line is two symmetrical metal strip lines placed on an inward side of the excitation strip line; the external coupling line is two symmetrical metal strip lines placed on an outward side of the excitation strip line; one terminal of a cross-layer composite line is initiated from a tail terminal of the internal coupling line, firstly extended downward towards a bottom portion of the dielectric adhesive, and then extended parallel to the bottom portion of the dielectric adhesive after being bent at 90 degrees, subsequently passing under the excitation strip line, until being reached under a tail terminal of the external coupling line, then extended upwards to connect to a tail terminal of the external coupling line to converge signals on the internal coupling line and the external coupling line into one path signal, and the one path signal is outputted from a balun output port through a composite output line; the internal coupling line is divided into two meander lines symmetrical about a central axis of the balun structure, and intermediate portions of the two segments of the internal coupling line are jointly connected to one terminal of an internal grounding line, and are connected to the four-port grounding terminal by an internal coupling line grounding port at another terminal of the internal grounding line; a metal protective ring wall is two segments of C-shaped metal walls symmetrically distributed outside the external coupling line, a bottom of the C-shaped metal wall is in contact with the metal ground structure; one terminal of the external coupling line is connected to the metal protective ring wall, a lower grounding line and an upper grounding line are respectively led out from the two segments of the metal protective ring wall and are respectively connected to the adjacent four-port grounding pad through a lower grounding port and an upper grounding port.

5. The on-chip dual-mode transmission line with the spoof surface plasmon based on the balun according to claim 1, wherein the balun structure further has a fifth structure, the fifth structure includes an odd-mode probe pad, an even-mode probe pad, ground probe pads, lower large plates, lower small plates; the odd-mode probe pad, the even-mode probe pad and the ground probe pads are located above the dielectric adhesive, the lower large plates and the lower small plates are located above the dielectric material; small-scale metal vias are arranged between the odd-mode probe pad and the lower small plate, between the even-mode probe pad and the lower small plate, and between the ground probe pads and the lower large plates, a back metallic via is arranged below the lower large plate, and the lowest portion of the back metallic via is in contact with the metal ground structure; in the fifth balun structure, a right-angle strip-shaped input line is located above the dielectric material, and is a metal strip line with a bent of 90°, one terminal of the right-angle strip-shaped input line is connected to the lower small plate below the odd-mode probe pad, and another terminal of the right-angle strip-shaped input line is connected to a port of a lower metal frame; the lower metal frame is formed by removing one longer side of a square frame, and an upper metal frame is located above the dielectric adhesive, and is a square frame by removing one longer side and a portion at an intermediate of another longer side of the upper metal frame, and remaining portions of the upper metal frame is directly opposite to the lower metal frame; and balun grounding transition lines are connected to ground probe pads on both side of the balun structure.

6. The on-chip dual-mode transmission line with the spoof surface plasmon based on the balun according to claim 1, wherein the branch in the dual-mode transmission line is a wave-shaped spoof surface plasmon unit, the wave-shaped spoof surface plasmon unit includes a plurality of wave-shaped structures placed in a region between the two metal strip lines parallel to each other and periodically arranged along a length direction of the metal strip line, the wave-shaped spoof surface plasmon unit is two wave-shaped spoof surface plasmon unit structures in mirror symmetry, each of the wave-shaped spoof surface plasmon structure includes a quarter-arc metal line, and upper semi-circular metal rings and lower semi-circular metal rings interconnected in dimension from large to small connected in a sequence, wherein one terminal of the quarter-arc metal line is connected to the metal strip line, and another terminal of the quarter-arc metal line is connected to the semi-circular metal ring.

7. The on-chip dual-mode transmission line with the spoof surface plasmon based on the balun according to claim 6, wherein a number of the semi-circular metal rings in the wave-shaped spoof surface plasmon unit is six, a dispersion cut-off frequency of the transmission line is reduced and a field confinement ability of a metal surface of the wave-shaped spoof surface plasmon unit is enhanced by increasing a quantity of the semi-circular metal rings.

8. The on-chip dual-mode transmission line with the spoof surface plasmon based on the balun according to claim 1, wherein the branch in the dual-mode transmission line is a broken-line-shaped spoof surface plasmon unit, the broken-line-shaped spoof surface plasmon unit includes a plurality of broken-line-shaped structures placed in a region between the two metal strip lines parallel to each other and periodically arranged along a length direction of the metal strip, the broken-line-shaped spoof surface plasmon unit is two broken-line-shaped spoof surface unit structures in mirror symmetry, each of the broken-line-shaped spoof surface plasmon unit includes square-wave structures connected sequentially, one terminal of the square-wave structure is connected to the metal strip line, another terminal of the square-wave structure is suspended in midair.

9. The on-chip dual-mode transmission line with the spoof surface plasmon based on the balun according to claim 8, wherein a number of the sequentially connected square-wave structure in the broken-line-shaped spoof surface plasmon unit is five, a cut-off frequency of the transmission line is reduced and a field confinement ability is enhanced by increasing a width of the metal strip line, increasing a length and a width of the square wave of the broken-line-shaped spoof surface plasmon unit, increasing a quantity of the square waves or increasing a period length of each of the broken-line-shaped spoof surface plasmon units.

10. The on-chip dual-mode transmission line with the spoof surface plasmon based on the balun according to claim 1, wherein the branch in the dual-mode transmission lines is a spring-shaped spoof surface plasmon unit, the spring-shaped spoof surface plasmon unit includes a plurality of spring-shaped structures placed in a region between the two metal strip lines parallel to each other and periodically arranged along a length direction of the metal strip line, the spring-shaped spoof surface plasmon unit is two spring-shaped spoof surface plasmon unit structures in upper and lower mirror-symmetry, each of the spring-shaped spoof surface plasmon unit includes a plurality of same-shaped semi-circular rings arranged in a periodic manner, and the adjacent semi-circular rings are connected to each other at openings through an interconnecting line, one terminal of the spring-shaped spoof surface plasmon unit is connected to a metal strip line, another terminal of the spring-shaped spoof surface plasmon unit is suspended in midair.

11. The on-chip dual-mode transmission line with the spoof surface plasmon based on the balun according to claim 10, wherein a number of the semi-circular rings in the spring-shaped spoof surface plasmon unit is six, a transmission cut-off frequency of the spring-shaped spoof surface plasmon unit is decreased and a field confinement ability of a metal surface of the spring-shaped spoof surface plasmon unit is enhanced by increasing an outer diameter or an inner diameter of the semi-circular ring, increasing a quantity of semi-circular rings, or increasing a period length of each of the spring-shaped spoof surface plasmon units.

12. The on-chip dual-mode transmission line with the spoof surface plasmon based on the balun according to claim 1, wherein the branch in the dual-mode transmission line is a butterfly-shaped spoof surface plasmon unit, the butterfly-shaped spoof surface plasmon unit includes a plurality of butterfly-shaped structures placed in a region between the two metal strip lines parallel to each other and periodically arranged along a length direction of the metal strip line, the butterfly-shaped spoof surface plasmon unit is a complete butterfly-shaped structure formed by two mirror-symmetrical half-butterflies, one terminal of the butterfly-shaped spoof surface plasmon unit is connected to the metal strip line, and another terminal of the butterfly-shaped spoof surface plasmon unit is suspended in midair.

13. The on-chip dual-mode transmission line with the spoof surface plasmon based on the balun according to claim 4, wherein the excitation strip line and the internal coupling line are edge-coupled, and the excitation strip line and the external coupling line are edge-coupled in the triple-conductor edge-coupled balun, a distance between edges of the internal coupling line and the excitation strip line is 5 um, and a distance between edges of the external coupling line and the excitation strip line is 5 um.

14. The on-chip dual-mode transmission line with the spoof surface plasmon based on the balun according to claim 1, wherein the main feeding line led out from the even-mode signal pad is connected at a center portion of a longer side of the ring line, two suspended terminals of the ring line are respectively connected to two sides of the two metal strip lines, the ring line is symmetrically distributed about the metal strip lines to implement an even-mode feeding with equal amplitude and same phase, and a length of the ring line is adjustable.

15. The on-chip dual-mode transmission line with the spoof surface plasmon based on the balun according to claim 4, wherein one antenna lead led out from the even-mode signal pad is connected to one terminal of the cross-layer coupling antenna between the two metal strip lines with a same structure and parallel to each other through two 90° bendings in a form of a strip-shaped line after passing through a trapezoidal transition section, and an even-mode signal is transmitted by the antenna lead and the cross-layer coupling antenna above the dielectric material.

* * * * *